United States Patent
Ichioka et al.

(10) Patent No.: US 7,944,520 B2
(45) Date of Patent: May 17, 2011

(54) LIQUID CRYSTAL DISPLAY DEVICE AND ELECTRONIC APPARATUS PROVIDED WITH SAME

(75) Inventors: Hideki Ichioka, Nabari (JP); Tomohiko Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 314 days.

(21) Appl. No.: 12/375,860

(22) PCT Filed: Jun. 14, 2007

(86) PCT No.: PCT/JP2007/061986
§ 371 (c)(1),
(2), (4) Date: Jan. 30, 2009

(87) PCT Pub. No.: WO2008/018233
PCT Pub. Date: Feb. 14, 2008

(65) Prior Publication Data
US 2009/0290089 A1 Nov. 26, 2009

(30) Foreign Application Priority Data
Aug. 11, 2006 (JP) .................................. 2006-220565

(51) Int. Cl.
G02F 1/1333 (2006.01)
H02B 1/015 (2006.01)
(52) U.S. Cl. .......................................... 349/58; 361/644
(58) Field of Classification Search ................. 349/58; 361/644
See application file for complete search history.

(56) References Cited

U.S. PATENT DOCUMENTS

| 6,847,415 | B1 * | 1/2005 | Yoshimura et al. ............. 349/58 |
| 2005/0151041 | A1 * | 7/2005 | Tatsukami et al. ........ 248/220.21 |
| 2006/0044490 | A1 | 3/2006 | Ichioka et al. |

FOREIGN PATENT DOCUMENTS

CN 1677188 A 10/2005
(Continued)

OTHER PUBLICATIONS

Official Communication issued in International Patent Application No. PCT/JP2007/061986, mailed on Jul. 24, 2007.
(Continued)

*Primary Examiner* — Mike Qi
(74) *Attorney, Agent, or Firm* — Keating & Bennett, LLP

(57) ABSTRACT

A liquid crystal display apparatus includes a liquid crystal display panel, a backlight system, a driving circuit board for driving the liquid crystal display panel and the backlight system, and a housing for housing the foregoing members. A metal plate is provided between the backlight system and the driving circuit board, which metal plate has a plane surface on a front and back surface which is broader than the backlight system and the driving circuit board. On at least a pair of opposed edges of the metal plate, at least one of a falling portion and a rising portion is provided along the edges of the metal plate. Further, a bezel is provided between the housing and at least one of the falling portion and rising portion, which bezel is arranged so as to integrally support the metal plate and at least the liquid crystal display panel and the backlight system. Hence, a liquid crystal display apparatus and an electronic apparatus including same are provided, which liquid crystal display apparatus is capable of reducing a possibility of breakage due to load placed on a display surface of the liquid crystal display panel or an impact when dropped.

22 Claims, 22 Drawing Sheets

FOREIGN PATENT DOCUMENTS

| | | |
|---|---|---|
| JP | 3-47584 U | 5/1991 |
| JP | 08-179289 A | 7/1996 |
| JP | 11-085045 A | 3/1999 |
| JP | 11-174206 A | 7/1999 |
| JP | 11-258599 A | 9/1999 |
| JP | 2000-315054 A | 11/2000 |
| JP | 2001-142404 A | 5/2001 |
| JP | 2001-188222 A | 7/2001 |
| JP | 2001-266759 A | 9/2001 |
| JP | 2003-149642 A | 5/2003 |
| JP | 2003-272422 A | 9/2003 |
| JP | 2004-163462 A | 6/2004 |
| JP | 2006-065008 A | 3/2006 |
| JP | 2006065008 A * | 3/2006 |
| WO | 2008/018232 A1 | 2/2008 |

OTHER PUBLICATIONS

Ichioka et al.: "Display Apparatus and Electronic Apparatus With the Same," U.S. Appl. No. 12/376,753; filed Feb. 6, 2009.

Official Communication issued in corresponding Chinese Patent Application No. 200780029111.3, mailed on Sep. 30, 2010.

* cited by examiner

FIG. 15

| SHAPE | DIFFERENCE IN SECOND MOMEMT OF AREA [$I$] | $I$: SECOND MOMENT OF AREA |
|---|---|---|
| | PLATE | PRESENT ARRANGEMENT |
| $I$ | $\dfrac{b_1 * t_1^3}{12}$ | $\dfrac{b_1 * t_1^3 + 2 * b_2 * t_2^3}{12}$ |

LIQUID CRYSTAL DISPLAY DEVICE AND ELECTRONIC APPARATUS PROVIDED WITH SAME

BACKGROUND OF THE INVENTION

1. Field of the Invention

The present invention relates to a liquid crystal display device which is suitable as a display section of a portable or a stationary electronic apparatus, and an electronic apparatus including the liquid crystal display device. More specifically, the present invention relates to reinforcement in strength of, for example, a slim liquid crystal display device. Further, the present invention relates to reinforcement in strength of a stationary electronic apparatus including a large-sized liquid crystal display device such as a liquid crystal TV (television) or the like as one example, when carrying or handling the stationary electronic apparatus.

2. Description of the Related Art

In recent years, a liquid crystal display device is commonly used as a display (display section) for a portable electronic apparatus (hereinafter referred to as "mobile apparatus"). The liquid crystal display device includes a liquid crystal display panel; the liquid crystal display panel is commonly arranged in such a manner that a pair of transparent substrates made of glass or the like sandwich a liquid crystal layer. The liquid crystal display device is widely used in a display for a notebook computer, and also a mobile apparatus such as an information mobile terminal (PDA: Personal Digital Assistant) and a mobile phone. This is because the liquid crystal display device excels in mobility, and also has low power consumption. From a point of mobility and convenience, the mobile apparatus is required to be thin, lightweight and strong.

The liquid crystal display device has also been commercialized as a stationary large-sized apparatus such as a slim TV, and such a liquid crystal display device is becoming widely spread. In recent years, demands for reducing thickness and weight of such stationary products have also been increasing. Therefore, as similar to the mobile apparatus, the large-sized liquid crystal display device requires to be, not only thin and lightweight, but also sufficiently durable to external pressure applied when carried, handled or generally used.

In response to such demands, approaches have been made to reduce the thickness and weight of the liquid crystal display device. However, attainment of strength has been difficult in line with such an approach.

That is to say, generally, the liquid crystal display device adopts an arrangement in which a chassis 107 is formed on a periphery of a light guiding plate 102b, as illustrated in FIG. 16. The chassis 107 serves as a supporting member of the light guiding plate 102b. However, since the light guiding plate 102b has become thin in response to the reduction in thickness and weight of a liquid crystal module, and since a housing of the liquid crystal display device is made of resin such as PMMA (PolyMethyl MethAcrylate), the liquid crystal display device is not strong in rigidity. Therefore, in a case where there is a step 107a generated due to the chassis 107 on a back side of the light guiding plate 102b, this step 107a becomes a cause of a partial warp in a liquid crystal display panel 101 as illustrated in FIGS. 17A and 17B. In some cases, breakage of the liquid crystal display device occurs as a result of this arrangement.

Moreover, from a layout point of view, many of the liquid crystal modules and the mobile apparatuses which include the liquid crystal module provide a driving circuit for driving the liquid crystal display panel, and/or another system, a battery, and the like on the back side of the liquid crystal module. Various chip parts that are mounted on the driving circuit have uneven planes, and a cover and a spacer for protecting the various chip parts from external pressure also have uneven planes. Therefore, the liquid crystal module and the mobile apparatus that include the liquid crystal module are arranged in such a manner that when a load is placed on the uneven planes, the liquid crystal display panel partially warps easily and readily.

In a case where the light guiding plate of the liquid crystal module is thin, and further has protrusions and depressions on its back side, the liquid crystal display panel made of glass may warp and break due to (i) pressure applied from a display surface, (ii) pushup force from a driving circuit board at a time when the liquid crystal module is dropped, or further (iii) a warp generated in the liquid crystal module at a time when the liquid crystal module is dropped. Accordingly, any liquid crystal module that has the possibility that any one of the foregoing may occur is considered as having insufficient mechanical strength as a product. Therefore, some kind of measure, particularly for improving rigidity of a housing section or the like is required for the liquid crystal display panel that is mounted in an apparatus such as the mobile apparatus that can be carried and the large-sized liquid crystal display device.

In response to this, many of the mobile apparatuses which use the liquid crystal display panel such as a tablet personal computer are designed to have a protection plate, which makes it difficult for external force such as an impact or the like to be applied on the liquid crystal display panel. Such arrangement has been adopted in many of the mobile apparatuses.

However, adoption of such arrangement requires a protection board that has a sufficient rigidity. Moreover, the arrangement is one in which a slight gap is formed between the liquid crystal display panel and the protection plate, so as to prevent force from being passed to the liquid crystal display panel. As a result, a measure for thickening the protection plate and/or the gap is required. Such measure is contrary to obtainment of a thin and lightweight end product, therefore, such measure is not preferable.

For example, Japanese Unexamined Patent Publication No. 142404/2001 (Tokukai 2001-142404) suggests an information display device as illustrated in FIG. 18A, including: a plate-shaped liquid crystal display panel 201 which serves as an information display; a metal plate 203 which is of a same size as the liquid crystal display panel 201 and is retained so as to cohere to a back surface of the liquid crystal display panel 201; a driving circuit board 204 provided on an opposite side of the liquid crystal display panel 201 on the metal plate 203, the driving circuit board 204 mounting a driving circuit for driving at least the liquid crystal display panel 201; an upper case (not illustrated) with an opening enabling visual perception of a display displayed on the liquid crystal display panel 201; and a lower case (not illustrated) for storing the liquid crystal display panel 201, the metal plate 203, and the driving circuit board 204, together with the upper case.

However, the conventional display device of Japanese Unexamined Patent Publication No. 142404/2001 (Tokukai 2001-142404) does not give consideration to a load placed on or an impact to the display surface and the back side of the display surface. For example, there is the problem that breakage may occur caused by a pressure load applied from the surface of the liquid crystal display panel 201, a pushup from a back side of the liquid crystal display panel 201, and/or a partial warp due to the change in shape.

More specifically, for example, as illustrated in FIG. 18B, a load placed on an upper side of the liquid crystal display panel 201 causes the metal plate 203 to warp, and effected by this warp, the liquid crystal display panel 201 and the light guiding plate 202b also warps. As a result, the liquid crystal display panel 201 breaks. The causes of this warp are, for example, the flexibility of the metal plate 203 caused by its thinness, and a step 204a formed between the metal plate 203 and the driving circuit board 204. These cause the liquid crystal display panel 201 and the like to bend at the step 204a.

Alternatively, there also is a problem such that if a driving circuit board 303 provided at a back side of the light guiding plate 302b has protruding sections 303a on a side of the driving circuit board 303 closer to the light guiding plate 302b as illustrated in FIG. 19, which protruding sections 303a are of a circuit part such as a coil or the like, the protruding sections 303a comes in contact with the light guiding plate 302b under an impact in a case where the liquid crystal display device is dropped. This causes a breakage of the protruding sections 303a or the light guiding plate 302b.

SUMMARY OF THE INVENTION

In view of the above problems, preferred embodiments of the present invention provide a liquid crystal display device and an electronic apparatus including the liquid crystal display device, which liquid crystal display device is capable of reducing a possibility of breakage caused by (i) a load placed on a display surface of a liquid crystal display panel, and/or (ii) an impact on the liquid crystal display device or the electronic apparatus at a time when the liquid crystal display device is dropped.

A liquid crystal display device according to a preferred embodiment of the present invention includes: a liquid crystal display panel; a backlight; a driving circuit board for driving the liquid crystal display panel and the backlight; a rigid plate made of rigid material, provided between the backlight and the driving circuit board, the rigid plate having a plane surface of a broader area than that of the backlight; and a housing for housing the liquid crystal display panel, the backlight, the driving circuit board, and the rigid plate; at least one of a falling portion and a rising portion being provided along at least a pair of opposed edges of the rigid plate, the falling portion projecting toward the driving circuit board side of the rigid plate, and the rising portion projecting toward an opposite side of the falling portion, the liquid crystal display device, further including: a frame member provided between the housing and at least one of the falling portion and the rising portion so as to integrally support the rigid plate and at least the liquid crystal display panel and the backlight.

According to a preferred embodiment of the present invention, a rigid plate is provided between the backlight and the driving circuit board, which rigid plate has a plane surface of a broader area than that of the backlight. Thus, the backlight is supported by a whole of a surface of the rigid plate. Hence, even if a load is applied from an upper side of the liquid crystal display panel, the backlight does not bend at an edge of the rigid plate.

Moreover, at least one of a falling portion and a rising portion is provided along at least a pair of opposed edges of the rigid plate, which falling portion projects toward a driving circuit board side of the rigid plate, and which rising portion projects toward an opposite side of the falling portion. Consequently, the falling portion or the rising portion provided along the edges allows the rigid plate to serve as a fixed beam. Moreover, the rigid plate thus having at least one of the falling portion and the rising portion causes an increase in a second moment of area (geometrical moment of inertia) of the rigid plate. As a result, a deflection (bending) is reduced. The effect of the reduction of the deflection is sufficient as long as at least one of the falling portion and the rising portion is formed along at least a pair of opposed edges of the rigid plate.

Further, the liquid crystal display device according to a preferred embodiment of the present invention includes a frame member provided between the housing and at least one of the falling portion and the rising portion so as to integrally support the rigid plate and at least the liquid crystal display panel and the backlight.

Providing of such frame member improves the rigidity of the falling portion or the rising portion of the rigid plate. Hence, the strength of the rigid plate as a supporting member improves, and the deflection is further reduced. As a result, strength and resistance against a load placed on or an impact on the liquid crystal display device is further improved. Moreover, such arrangement allows dispersion of an impact on a front or back surface of the liquid crystal display device, from the housing to the rigid plate via the frame member. Hence, it is possible to reduce a possibility of a breakage of the liquid crystal display device.

Note that a shape of the rigid plate may be, other than a rectangle or a square, a trapezoid, or a polygon.

It is preferable for the liquid crystal display device according to a preferred embodiment of the present invention to have at least one of an upper end of the rising portion and a lower end of the falling portion arranged to be in contact with at least one of the frame member and the housing.

That is to say, the rigid plate functions as a fixed beam when at least one of an upper end of the rising portion and a lower end of the falling portion of the rigid plate is in contact with at least one of the frame member and the housing. Hence, the deflection is reduced.

Further, it is possible to integrally support at least the liquid crystal display panel, the backlight, and the rigid plate, by use of the frame member. Therefore, the liquid crystal display panel, the backlight, and the rigid plate can be handled as an integrated unit, that is, a liquid crystal module.

The frame member may be inseparable. In this case, assembling of the frame member to the liquid crystal module is simplified.

Alternatively, the frame member may be divided into a plurality of units. In this case, the frame member may be designed more flexibly, which allows assembling of the frame member to variously embodied liquid crystal modules.

Further, the frame member may be of a cartridge type that causes a liquid crystal module to slide and to be mounted inside the frame member, the liquid crystal module including the liquid crystal display panel, the backlight, and the rigid plate. In this case also, the assembling of the frame member to the liquid crystal module is simplified.

Note that the driving circuit board can be included in the liquid crystal module.

In the liquid crystal display device according to a preferred embodiment of the present invention, the rigid plate may have a projection extending parallel or substantially parallel to a plane surface on which the backlight is mounted, the projection fitting into a hole of the frame member.

Such an arrangement simplifies a step of assembling the frame member and the rigid plate, as compared to a method in which the frame member and the rigid plate are screwed together.

It is preferable for the projection to further fit into a hole of the housing.

This thus improves an effect of dispersing the impact on a front or back surface of the liquid crystal display device, from the housing to the frame member and the rigid plate, via the projection.

The frame member may be arranged such that the frame member has a first protrusion, which protrudes toward inside of the frame member, and which fits into a first depression of a sidewall of the rigid plate, the sidewall including at least one of the falling portion and the rising portion, the frame member fixed to the rigid plate through a joint of the first protrusion and the first depression.

In this case, an arrangement may be adopted such that the housing has a second protrusion, which protrudes toward inside of the housing, and which fits into a second depression of a sidewall of the frame member, the housing fixed to the frame member through a joint of the first protrusion and the first depression.

By concentrically providing the first depression, the first protrusion, the second depression, and the second protrusion, the first protrusion which protrudes toward the inside of the frame member from the sidewall of the frame member and the second depression of the sidewall of the frame member can be unified. Hence, an arrangement for integrating the rigid body, the frame member and the housing is simplified to the utmost.

Further, the rigid body has a back surface of a broader area than that of the driving circuit board, and the driving circuit board is formed so that a side facing the rigid plate is flat and even in level, and is provided so as to be in contact with the rigid plate.

Even if there is an impact such as a drop due to gravity, there are no protruding sections of, for example, circuit components or the like, on a backlight side of the driving circuit board. Therefore, breakage of the backlight or the protruding section of the circuit component or the like does not occur due to an impact of the protruding section with the backlight.

Moreover, the driving circuit board is arranged so as to be in contact with the rigid plate. Thus, the driving circuit board is integrated with the rigid plate. Therefore, the rigidity of the rigid plate is improved, and heat can be released from the driving circuit board via the rigid plate.

As a result, it is possible to provide a liquid crystal display device capable of reducing breakage caused by (i) a load placed on the display surface of the liquid crystal display panel and (ii) the impact on the liquid crystal display device when dropped.

It is preferable for the liquid crystal display device according to a preferred embodiment of the present invention to include at least one joining and fixing member arranged to join and fix the driving circuit board to the rigid plate.

The joining and fixing member joins and fixes the driving circuit board to the rigid plate, which as a result completely integrates the driving circuit board and the rigid plate. Hence, the rigidity of the rigid plate is further improved.

It is preferable for the joining and fixing member in the liquid crystal display device according to a preferred embodiment of the present invention to include: a projecting section provided on a back surface of the rigid plate; a through hole of the driving circuit board into which the projecting section is to be inserted; and a screw having a screw head broader than the through hole, which is screwed to a top section of the projecting section inserted into the through hole of the driving circuit board.

In joining and fixing the driving circuit board to the back surface of the rigid plate in the joining and fixing member, first, a projecting section provided on a back surface of the rigid board is inserted into a through hole of the driving circuit board. Next, a screw is screwed to a top section of the projecting section. The first screw has a screw head broader than the through hole, therefore the driving circuit board is easily held and fixed by the screw head. Hence, the driving circuit board is fixed so as to be in contact with the back surface of the rigid plate.

For example, in a case where the rigid plate is thin and no projecting section is provided on the back surface of the rigid plate, the screw penetrates through the rigid plate and reaches the backlight. Regarding this point, according to a preferred embodiment of the present invention, the projecting section provided on the back surface of the rigid plate prevents breakage of the backlight caused by the first screw reaching the backlight.

Moreover, it is preferable for the joining and fixing member of the liquid crystal display device according to a preferred embodiment of the present invention to include: a projecting section provided on a back surface of the rigid plate; a through hole of the driving circuit board into which the projecting section is to be inserted; and a screw, which is screwed to a top section of the projecting section inserted into the through hole of the driving circuit board, via a washer that is broader than the through hole.

Use of the washer which functions as the screw head broader than the through hole allows easy holding and fixing of the driving circuit board, even if the screw that has the screw head broader than the through hole is not used.

Moreover, it is preferable for the rigid plate and the screw in the liquid crystal display device according to a preferred embodiment of the present invention to be made of metal material, and that a ground terminal is provided around the through hole of the driving circuit board so as to be directly or indirectly in touch with and electrically connected to the screw while the screw is tightened up.

Consequently, grounding of the driving circuit board can be provided via a ground terminal, a washer and screw, and the rigid plate made of metal material. Moreover, heat generated from a chip and the like on the driving circuit board are transmitted to the rigid plate from the ground terminal of the driving circuit board to the rigid plate via the washer and the screw. Therefore, the liquid crystal display device also excels in heat releasing property.

It is preferable in the liquid crystal display device according to a preferred embodiment of the present invention that a rising portion is provided along at least a pair of opposed edges on the rigid plate, which rising portion projects toward an opposite side of the driving circuit board side.

According to a preferred embodiment of the present invention, the rising portion is provided along at least a pair of opposed edges of the rigid plate, which rising portion projects toward an opposite side of the driving circuit board side. This allows a further increase in the second moment of area, which as a result reduces the deflection.

It is preferable for the rigid plate of the liquid crystal display device according to a preferred embodiment of the present invention to be formed in a rectangular or substantially rectangular shape, for example. Note that a rectangular shape denotes a rectangle or a square, or a shape close to a rectangle or a square.

This makes it possible to provide a liquid crystal display device capable of reducing breakage caused by a load placed on the display surface of the liquid crystal display panel and an impact on the liquid crystal display device when dropped, in a case where the shape of the liquid crystal display device is of a common rectangle.

Moreover, it is preferable for the rigid plate of the liquid crystal display device according to a preferred embodiment of the present invention to be of a rectangular shape, and have both of the falling portion and the rising portion formed along the at least a pair of opposed edges of the rigid plate.

According to a preferred embodiment of the present invention, the rigid plate preferably has a rectangular or substantially rectangular shape, and both the falling portion and rising portion are arranged along the edges on the at least a pair of opposed edges of the rigid plate.

Thus, both the falling portion and the rising portion are arranged on edges of an entire periphery of the rectangle. Therefore, the rigid plate serves as a fixed beam in transverse and longitudinal directions, and further the second moment of area is increased. Therefore, the deflection is further reduced.

It is preferable for the rigid plate of the liquid crystal display device according to a preferred embodiment of the present invention to be made of metal material.

Thus, a common metal plate may be readily used as the rigid plate, which metal plate allows easy processing of the falling portion. Hence, such a metal plate requires low cost. Further, the metal plate may be used for grounding the liquid crystal display device, which further allows adding of a heat releasing effect in response to heat generation from the driving circuit board and the backlight.

Moreover, it is preferable for the metal material in the liquid crystal display device according to a preferred embodiment of the present invention to be aluminum alloy or magnesium alloy.

This allows for reduction in weight and improvement in rigidity of the metal plate, and the liquid crystal display device having a further excellent heat releasing property due to a high thermal conductivity of the metal plate.

Moreover, it is preferable for the backlight in the liquid crystal display device according to a preferred embodiment of the present invention to include a light guiding plate. This allows reduction of thickness of the backlight.

In another preferred embodiment of the present invention, a portable electronic apparatus or a stationary electronic apparatus according to a preferred embodiment of the present invention includes the liquid crystal display device.

This thus allows for providing of a portable electronic apparatus or a stationary electronic apparatus including the liquid crystal display device that is capable of reducing breakage caused by a load placed on the display surface of the liquid crystal display panel and impact on the liquid crystal display device when dropped.

Each of the features of a liquid crystal display device according to the different preferred embodiments of the present invention may be freely combined.

For a fuller understanding of the nature and advantages of preferred embodiments of the present invention, reference should be made to the ensuing detailed description taken in conjunction with the accompanying drawings.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 15 is an explanatory view illustrating a difference in a second moment of area between a flat plate and an H-shaped plate.

DETAILED DESCRIPTION OF THE PREFERRED EMBODIMENTS

Reference Example

A reference example of the present invention is described below with reference to FIGS. 1 through 8. The following reference example is applicable to arrangements of preferred embodiments of the present invention later described.

Figure 2:
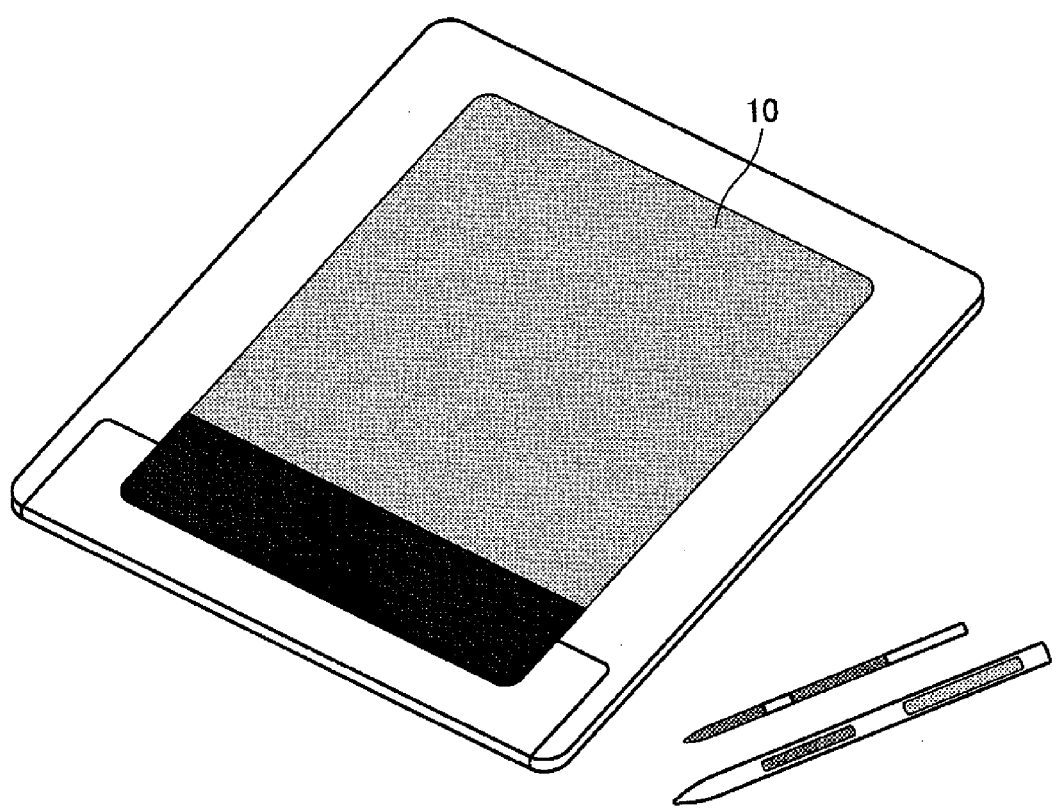
FIG. 2 is a perspective view illustrating a portable electronic apparatus including the liquid crystal display device.

A liquid crystal display device 10 of the present preferred embodiment preferably is, for example, incorporated in a portable electronic apparatus such as a tablet personal computer, as illustrated in FIG. 2. However, it is not necessarily limited to this, and the portable electronic apparatus may be, for example, a display for a notebook computer, an information mobile terminal (PDA: Personal Digital Assistant), or a mobile phone. The liquid crystal display device 10 may also be provided in a stationary electronic apparatus including a large-sized liquid crystal display device such as a liquid crystal TV.

Figure 1:
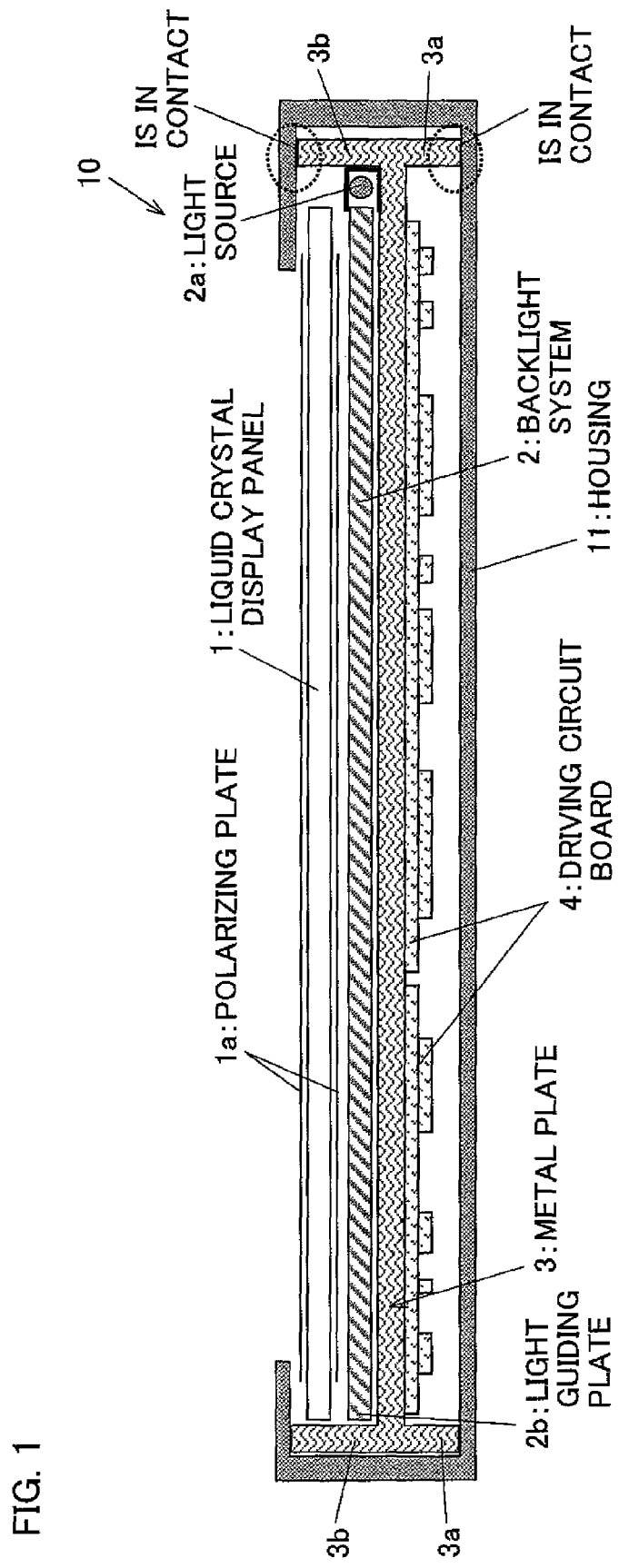
FIG. 1 is a cross sectional view illustrating a reference example of a liquid crystal display device according to a preferred embodiment of the present invention.

The following description explains an arrangement of the liquid crystal display device 10 with reference to FIG. 1. FIG. 1 is a cross sectional view illustrating the arrangement of the liquid crystal display device 10.

The liquid crystal display device 10, as illustrated in FIG. 1, is constructed by stacking, in order from top, a liquid crystal display panel 1, a backlight system 2, a metal plate 3, and a driving circuit board 4. In addition, a housing 11 is provided at an outermost section of such members.

The liquid crystal display panel 1 is arranged such that two transparent substrates which are made of glass and have electrodes are adhered together via liquid crystal, and polarizing plates 1a are adhered to both surfaces of the liquid crystal display panel 1, respectively. The liquid crystal display panel 1 carries out display by controlling a voltage thus applied to the liquid crystal so as to control an orientation of the liquid crystal and operate a light transmitting amount emitted from a light source 2a provided on a back side of the liquid crystal display panel 1.

The backlight system 2 as a backlight provided on a back side of the liquid crystal display panel 1 includes the light source 2a which is a light emitting body such as a fluorescent light or an LED, and a light guiding plate 2b for guiding light emitted from the light source 2a to an entire surface of the liquid crystal display panel 1. In the present invention, the light guiding plate 2b is not necessarily provided. Moreover, an optical sheet not illustrated may be provided between the liquid crystal display panel 1 and the light guiding plate 2b for evenly dispersing the light guided from the light guiding plate 2b, or for improving a light usage efficiency. Further, on a back side of the light guiding plate 2b, a reflection sheet not illustrated may be provided for improving usage efficiency of the light emitted from the light source 2a.

The metal plate 3 is preferably made of metal material such as aluminum alloy, magnesium alloy, titanium alloy, or SUS (stainless steel), and is shaped as a rectangle or substantially a rectangle, for example. Metal is a material which has relatively high rigidity, therefore is suitable for the metal plate 3. Note that a square is included in a concept of a rectangle. The present invention is not necessarily limited to the metal plate 3, and may also be a plate made of other rigid material such as carbon resin or other hard ceramic material.

Figure 3A:
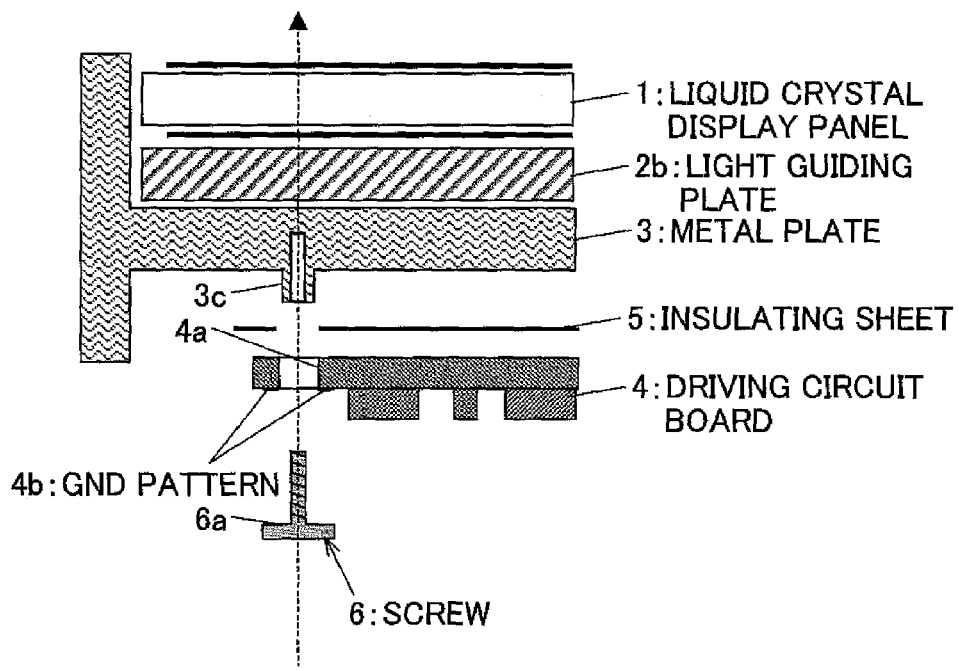
FIG. 3A is an exploded cross sectional view illustrating a method for fixing a metal plate and a driving circuit board of the liquid crystal display device.
Figure 3B:
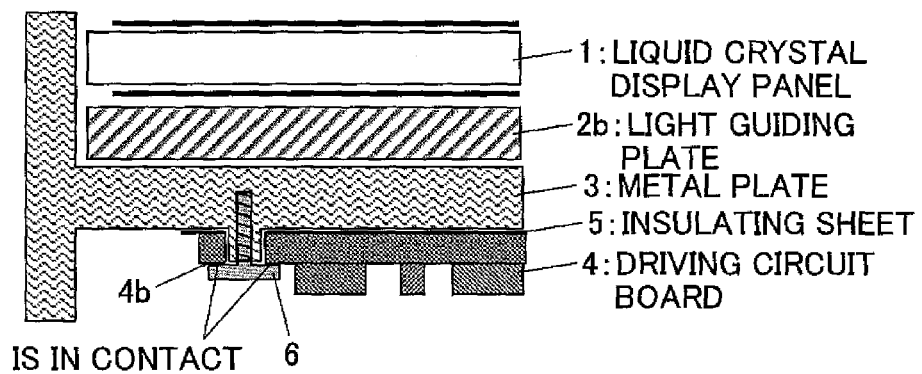
FIG. 3B is a cross sectional view illustrating a method for fixing a metal plate and a driving circuit board of the liquid crystal display device.

The driving circuit board 4 is provided on a back surface of the metal plate 3 via an insulating sheet 5 as illustrated in FIGS. 3A and 3B. The driving circuit board 4 includes an integrated circuit, a battery, and the like for driving the liquid crystal display panel 1 and the backlight system 2. The insulating sheet 5 is unnecessary in a case where the plate made of rigid material is not a conductive material.

The driving circuit board 4 is packaged on just one side. A side of the driving circuit board 4 which faces the metal plate 3 is formed flat and even in level, and is to be in contact with the back surface of the metal plate 3.

In the present preferred embodiment, a projecting section 3c is provided on the back surface of the metal plate 3, and a through hole 4a into which the projecting section 3c is to be inserted is provided on the driving circuit board 4, as illustrated in FIGS. 3A and 3B. Accordingly, a first screw 6 which is a screw having a screw head 6a broader than the through hole 4a is screwed to a top section of the projecting section 3c inserted into the through hole 4a of the driving circuit board 4. A height of the projecting section 3c may be same or lower than that of the through hole 4a.

The driving circuit board 4 is to be joined and fixed to the back surface of the metal plate 3 in the following method. First, the projecting section 3c provided on the back surface of the metal plate 3 is inserted into the through hole 4a of the driving circuit board 4. Next, the first screw 6 is screwed to the top section of the projecting section 3c. At this point, the driving circuit board 4 is easily held and fixed by the screw head 6a, since the screw head 6a of the first screw 6 is broader than the through hole 4a. Thus, it is possible to fix the driving circuit board 4 so that the back surface of the metal plate 3 is in contact with the driving circuit board 4. As a result, the rigidity of the entire liquid crystal display device 10 is improved. Moreover, a heat releasing function is also obtained, by which heat of the driving circuit board 4 is released via the metal plate 3.

Moreover, in the present preferred embodiment, it is preferable to form a ground (GND) pattern 4b around the through hole 4a of the driving circuit board 4 as a ground terminal, and to form the first screw 6 by metal material. The screw head 6a is in touch with the ground (GND) pattern 4b while the first screw 6 is tightened up. Consequently, the ground (GND) pattern 4b and the metal plate 3 are electrically connected to each other via the first screw 6. Hence, it is possible to ground the metal plate 3. Moreover, heat generated from chips and the like on the driving circuit board 4 is also transmitted to the ground (GND) pattern 4b via the first screw 6. Therefore, the arrangement also excels in a heat releasing point of view.

Figure 4A:
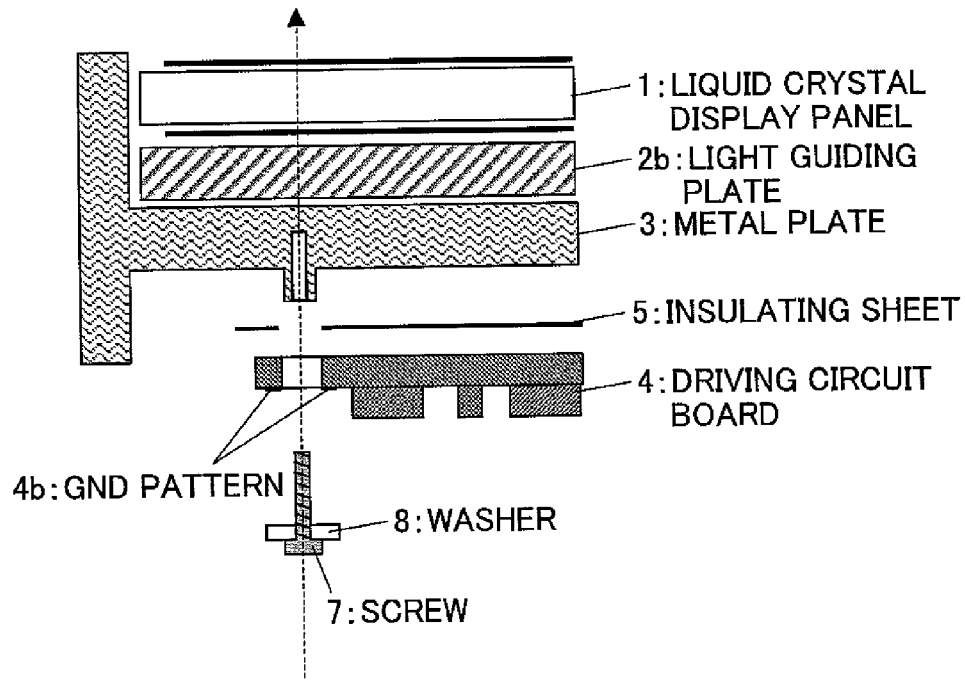
FIG. 4A is an exploded cross sectional view illustrating another method for fixing a metal plate and a driving circuit board of the liquid crystal display device.
Figure 4B:
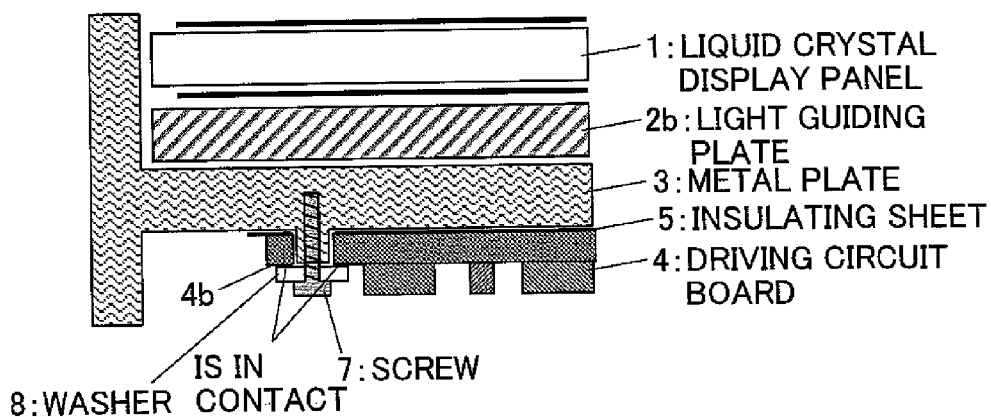
FIG. 4B is a cross sectional view illustrating another method for fixing a metal plate and a driving circuit board of the liquid crystal display device.

In the above explanation, the first screw 6 having the screw head 6a broader than the through hole 4a is screwed to the projecting section 3c, however it is not limited to this. For example, as illustrated in FIGS. 4A and 4B, a second screw 7 may be used as a screw that is to be screwed via a washer 8 that is broader than the through hole 4a. Therefore, it is possible to use the second screw 7 that is generally commercialized, not necessarily the first screw 6 that is specially ordered to have a broad screw head 6a. Moreover, heat generated from chips and the like on the driving circuit board 4 are also transmitted to the ground (GND) pattern 4b via the washer 8 and the second screw 7. Therefore, the arrangement also excels in a heat releasing point of view.

Thus, the projecting section 3c on the back surface of the metal plate 3, the through hole 4a on the driving circuit board 4, the first screw 6 which has the screw head 6a broader than the through hole 4a, and the second screw 7 which is screwed to the projecting section 3c via the washer 8 that is broader than the through hole 4a have a function as the joining and fixing member according to a preferred embodiment of the present invention.

As the joining and fixing member, other methods for joining and fixing may be possible such as joining and fixing by use of an adhesive or a double-sided adhesive sheet, or by use of a claw not illustrated. However, mechanical fixing such as screwing is preferable from a point of strength reinforcement against, for example, pulling force in a horizontal direction.

Figure 5:
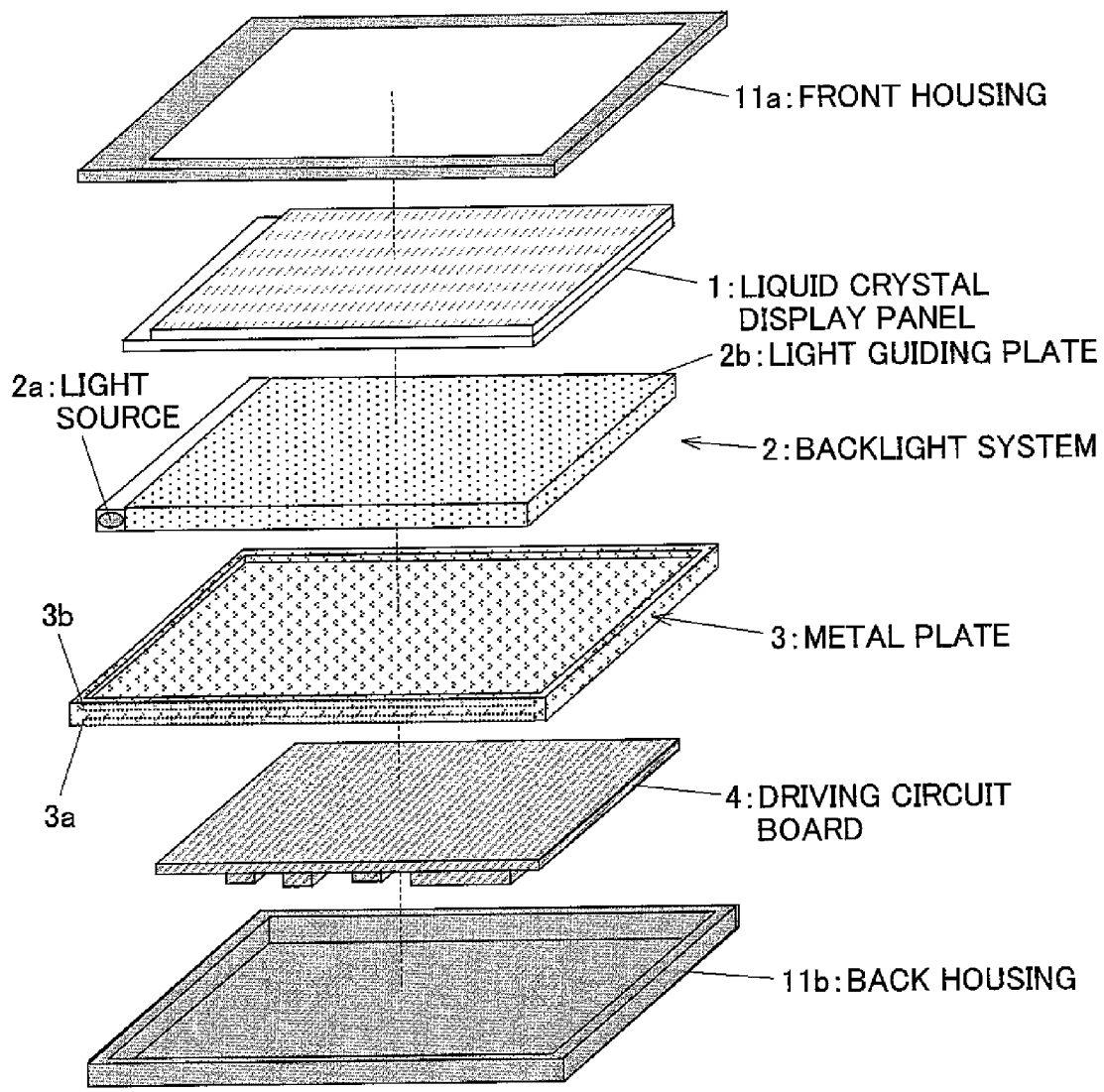
FIG. 5 is an exploded perspective view illustrating an arrangement of the liquid crystal display device.

The housing 11 may be separated into two parts of a front housing 11a and a back housing 11b, as illustrated in FIG. 5.

In a case where the liquid crystal display device 10 is to be assembled, a stacked body of the liquid crystal display panel 1, the backlight system 2, the metal plate 3, and the driving circuit board 4 are housed in an inside of the back housing 11b, and further the front housing 11a is placed thereon. The front housing 11a and the back housing 11b are arranged in an openable state. Moreover, the front housing 11a has an opening such that a display section of the liquid crystal display panel 1 is exposed. Further, the front housing 11a, the metal plate 3, and the back housing 11b are connected to each other, by use of for example a screw, in a state in which an inverter, a control circuit and the like not illustrated are included in the liquid crystal display device 10.

This fixes the metal plate 3 to the front housing 11a and the back housing 11b. As a result, the liquid crystal display panel 1, the backlight system 2, the metal plate 3, the driving circuit board 4, the front housing 11a, and the back housing 11b are stacked having a high rigidity.

In the liquid crystal display device 10, the liquid crystal display panel 1 is made of glass, which is fragile material. Therefore, a pressured section partially bends. Further, when a bending stress is applied to the liquid crystal display panel 1 equal to or more than an allowable amount, the liquid crystal display panel 1 breaks.

Accordingly, in the present reference example, an improvement is made to the metal plate 3 such that pressure applied to a display surface of the liquid crystal display panel 1, a pushup force applied from the driving circuit board 4 when dropped due to gravity, and a warp of the liquid crystal module when dropped due to gravity are reduced, while accomplishing a thin and lightweight liquid crystal display device.

The following description explains a characteristic of an arrangement of the liquid crystal display device 10.

The present preferred embodiment first eliminates steps on a back side of the liquid crystal display device 10, and improves a rigidity of the back side of the liquid crystal display device 10 while reducing thickness and weight of the liquid crystal display device 10. This enables an arrangement in which the liquid crystal display panel 1 placed on an upper side of the liquid crystal display device 10 is difficult to be bent.

Figure 16:
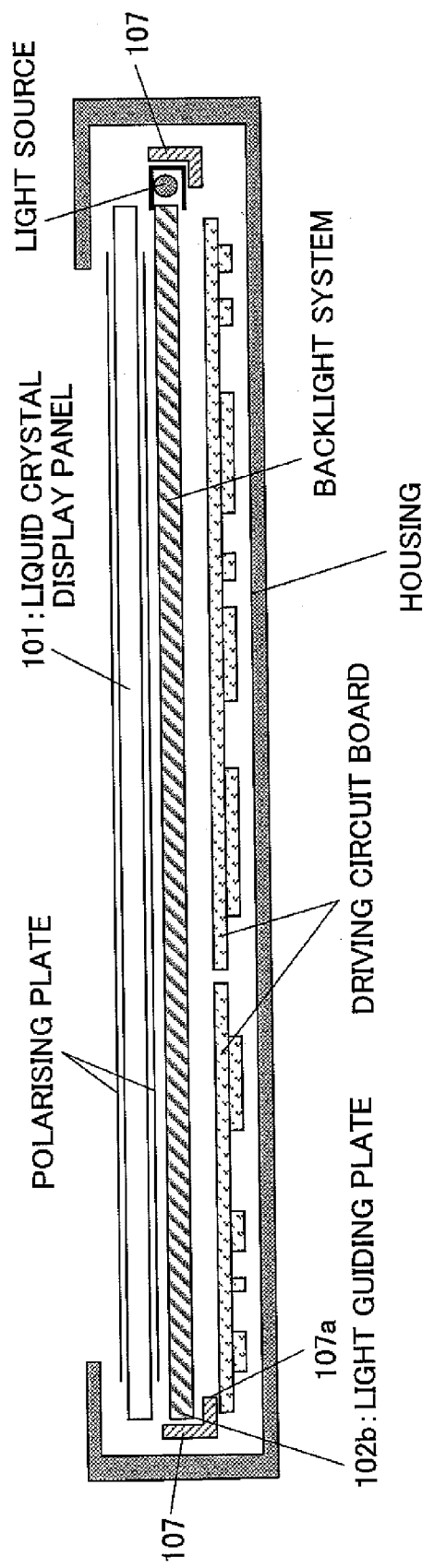
FIG. 16 is a cross sectional view illustrating an arrangement of a conventional liquid crystal display device.
Figure 17A:
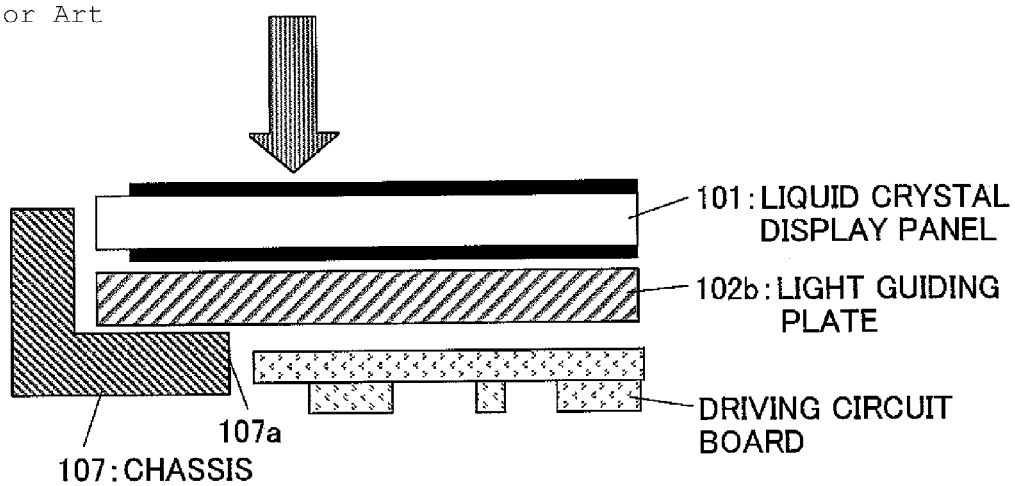
FIG. 17A is a cross sectional view illustrating the liquid crystal display device when a load is placed on the liquid crystal display device from an upper side of a liquid crystal display panel.
Figure 17B:
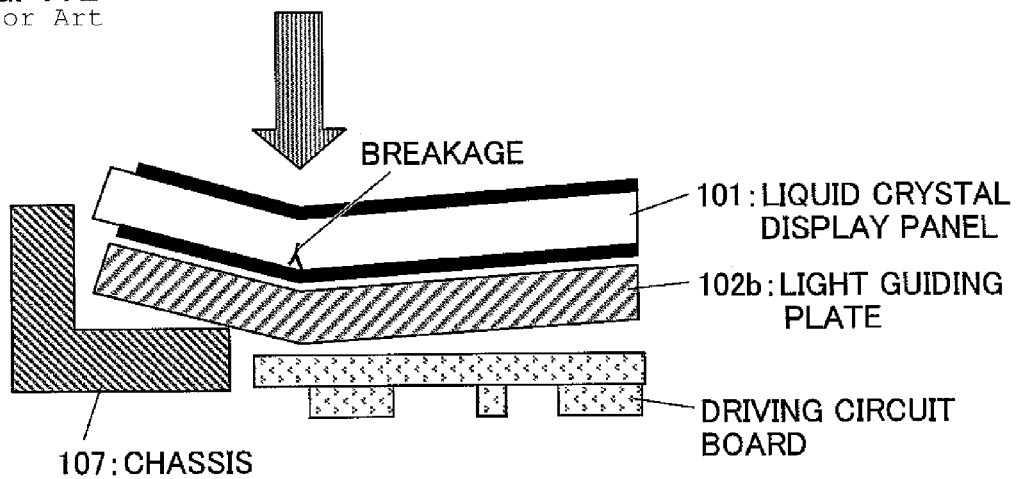
FIG. 17B is a cross sectional view illustrating the liquid crystal display device which has broken down due to the load.

More specifically, the step 107a is eliminated by eliminating the conventionally provided chassis 107 illustrated in FIG. 16.

Moreover, the metal plate 3 provided on the back side of the liquid crystal display device 10 is a rectangular plate made of rigid material which has a plane surface of a broader area than that of the light guiding plate 2b; and the backlight system 2 including the light source 2a is supported by a flat surface of the metal plate 3. Further, both a falling portion 3a and a rising portion 3b are formed on edges of the metal plate 3. The rising portion 3b projects upper than the display surface of the liquid crystal display panel 1. The falling portion 3a extends lower than a back surface of the driving circuit board 4. Such arrangement allows providing the driving circuit board 4 without forming a step under the light guiding plate 2b.

Figure 6:
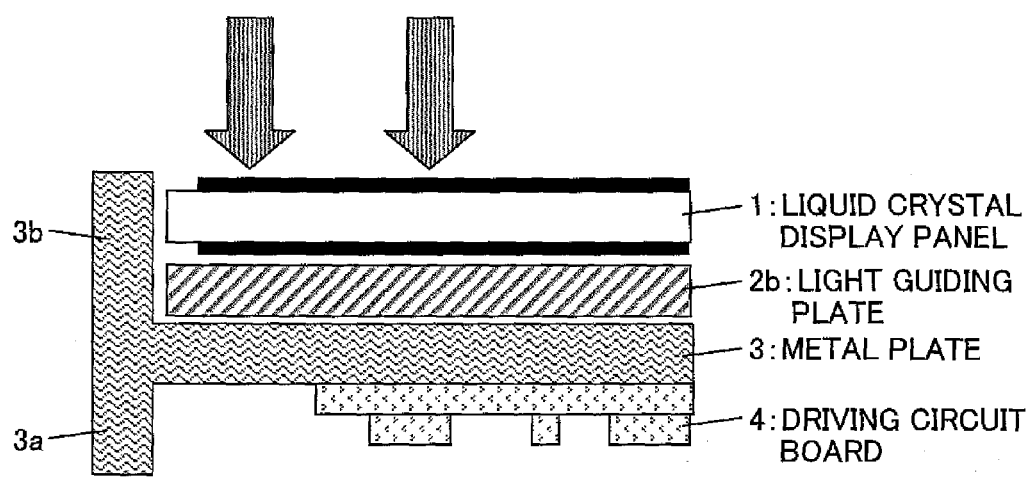
FIG. 6 is a cross sectional view illustrating an arrangement of the liquid crystal display device when a load is placed on the liquid crystal display device from an upper side of a liquid crystal display panel.

As a result, as illustrated in FIG. 6, even if a load is applied from a surface side of the liquid crystal display panel 1, a part of the light guiding plate 2b of the backlight system 2 does not bend. Moreover, an impact on the liquid crystal display device when dropped in a state in which the display surface of the liquid crystal display panel 1 is faced downwards is received by the outer periphery of the metal plate 3. This allows dispersion of the impact. The falling portion 3a and the rising portion 3b may be made of GFRP (Glass Fiber Reinforced Plastics) or the like if necessary.

Figure 7:
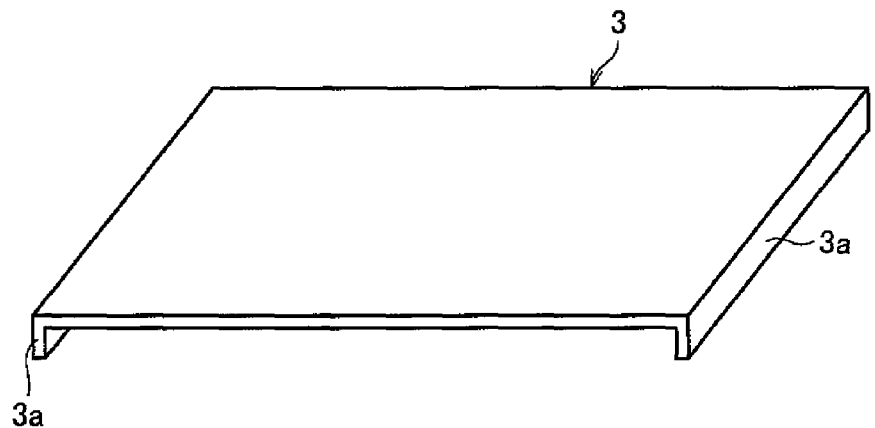
FIG. 7 is a perspective view illustrating a modification of a metal plate of the liquid crystal display device.

The falling portion 3a and the rising portion 3b are provided along opposed edges of a rectangular metal plate 3 as illustrated in FIG. 5, in the present preferred embodiment. Note that preferably there are two pairs of edges as the opposed edges. However, the present invention is not necessarily limited to this, and is sufficient as long as at least the falling portions 3a are provided along at least a pair of opposed edges of the metal plate 3, as illustrated in FIG. 7.

Figure 8:
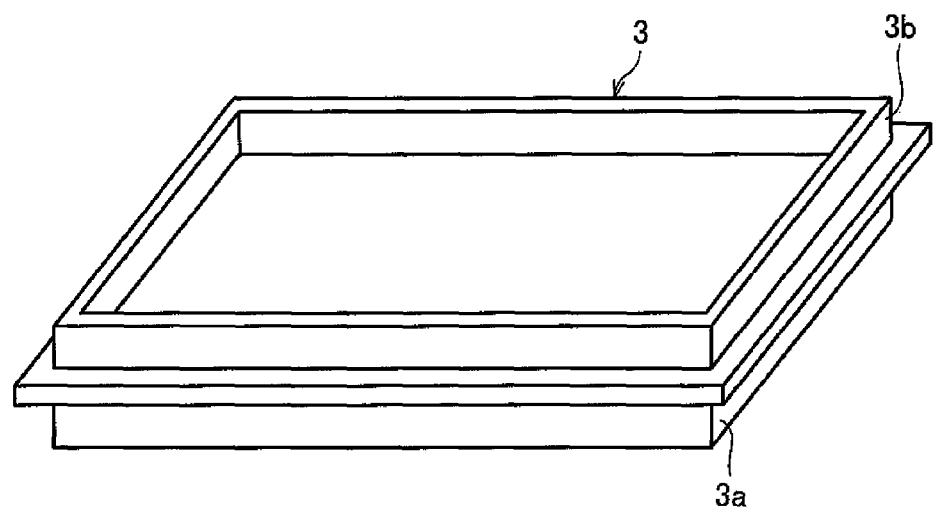
FIG. 8 is a perspective view illustrating another modification of a metal plate of the liquid crystal display device.

In the present preferred embodiment, the falling portion 3a and the rising portion 3b are preferably arranged along edges of the metal plate 3. However, the present invention is not necessarily limited to this, and may be provided on a position a little inside of the edges of the metal plate 3, as illustrated in FIG. 8.

Further, the falling portion 3a and the rising portion 3b are sufficient as long as the falling portion 3a and the rising portion 3b are arranged along the edges. That is to say, the falling portion 3a and the rising portion 3b are not necessarily completely continuous, respectively; the falling portion 3a and the rising portion 3b may have a portion which is unconnected, although most parts are continuous.

Moreover, in the present preferred embodiment, when the falling portion 3a and the rising portion 3b are positioned on the edges of the metal plate 3, a lower end of the falling portion 3a and an upper end of the rising portion 3b are to be in contact with the housing 11 of the liquid crystal display device 10, as illustrated in FIG. 1. As such, since the metal plate 3 is supported in such a manner that the metal plate 3 is fixed to the housing 11, the liquid crystal display device 10 can be arranged such that the liquid crystal display device 10 is strong and sufficiently resistant against pressure applied to the display surface and the back surface of the liquid crystal display panel 1, and pushup of the driving circuit board 4 or the like when dropped due to gravity; that is, the liquid crystal display panel 1 is arranged to have a low possibility of the liquid crystal display panel 1 to warp.

A step is generated under the light guiding plate 2b in a case where the light guiding plate 2b is broader than a flat part on a surface of the metal plate 3, and also in a case where the metal plate 3 has a depression. This indicates that, as similar to the conventional product, the arrangement is one which the liquid crystal display panel 1 is easily breakable due to a stress concentration on the step. Therefore, a flat plane of the metal plate 3 positioned under the light guiding plate 2b necessarily reaches an area outside of the light guiding plate 2b.

The rigidity of the whole of the liquid crystal display device 10 against bending and twisting of the liquid crystal display device 10 can be improved by providing the falling portion 3a and rising portion 3b. As a result, it is possible to suppress generation of a warp on the liquid crystal display device 10 caused by an impact when dropped. This indicates that it is difficult for the liquid crystal display panel 1 to warp and break at a time when the liquid crystal display device 10 is dropped due to gravity.

Further, the falling portion 3a and the rising portion 3b each is in contact with an inside of the housing 11. This allows dispersion and carriage of impact force from the housing 11 to the metal plate 3 when dropped in a state in which the display surface or the back surface is facing downwards. Hence, the impact against the liquid crystal display panel 1 is suppressed, which thus allows further reinforcement in strength.

The present preferred embodiment has an arrangement in which the lower end of the falling portion 3a is in contact with an inside of the back housing 11b, and the upper end of the rising portion 3b is in contact with an inside of the front housing 11a. This thus allows dispersion and carriage of the impact force when dropped in a state in which the display surface is facing downwards, in the following order: front housing 11a→metal plate 3→back housing 11b; and back housing 11b→metal plate 3→front housing 11a. Thus, the impact against the liquid crystal panel 1 is suppressed, which further allows reinforcement of strength.

Preferred embodiments of the present invention are explained as below with reference to FIGS. 9A through 15, and FIGS. 20 through 23. Arrangements that are identical to the foregoing reference example use identical reference numerals, and explanations thereof are omitted. Note that the present invention is not limited to the following preferred embodiments.

Figure 9A:
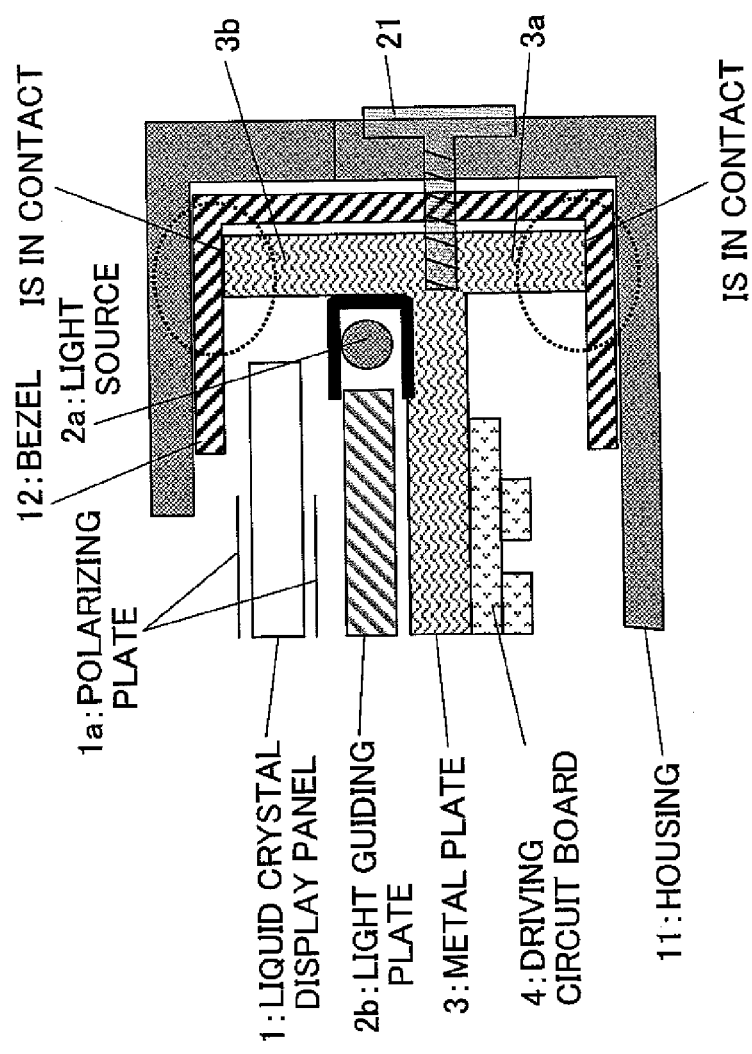
In FIG. 9A is a cross sectional view illustrating an arrangement in a case where a metal plate, a bezel, and a housing of a liquid crystal display device in accordance with one preferred embodiment of the present invention are assembled together by use of a fixing screw.
Figure 9B:
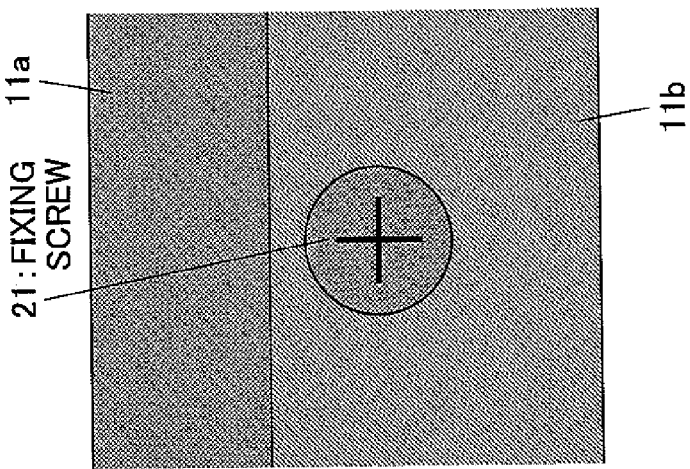
FIG. 9B is a side view illustrating the arrangement in the case where the metal plate, the bezel, and the housing of the liquid crystal display device are assembled together by use of the fixing screw.

In the present preferred embodiment, as illustrated in FIGS. 9A and 9B, a bezel 12 (frame member) is sandwiched between the housing 11 and the metal plate 3. The bezel 12 integrally supports the liquid crystal display panel 1, the backlight system 2, the metal plate 3 and the driving circuit board 4. In the present invention, the bezel 12 is sufficient as long as the bezel 12 integrally supports at least the liquid crystal display panel 1, the backlight system 2, and the metal plate 3. In this case, the upper end of the rising portion 3b and the lower end of the falling portion 3a is in contact with at least one of the bezel 12 and the housing 11.

A material usable for constructing the bezel 12 can be selected from metals such as aluminum, magnesium, SUS, titanium or the like, or reinforced plastic such as CFRP (Carbon Fiber Reinforced Plastics) or GFRP.

The bezel 12 is shaped so as to surround outer wall surfaces of the falling portion 3a and the rising portion 3b, the lower end of the falling portion 3a, and the upper end of the rising portion 3b, and to circumscribe the falling portion 3a and the rising portion 3b, as illustrated in FIG. 9A, for example. A longitudinal section of the outer wall is parallel or substantially parallel to a direction with which the liquid crystal display panel 1, the backlight system 2, the metal plate 3 and the driving circuit board 4 are stacked.

Figure 10A:
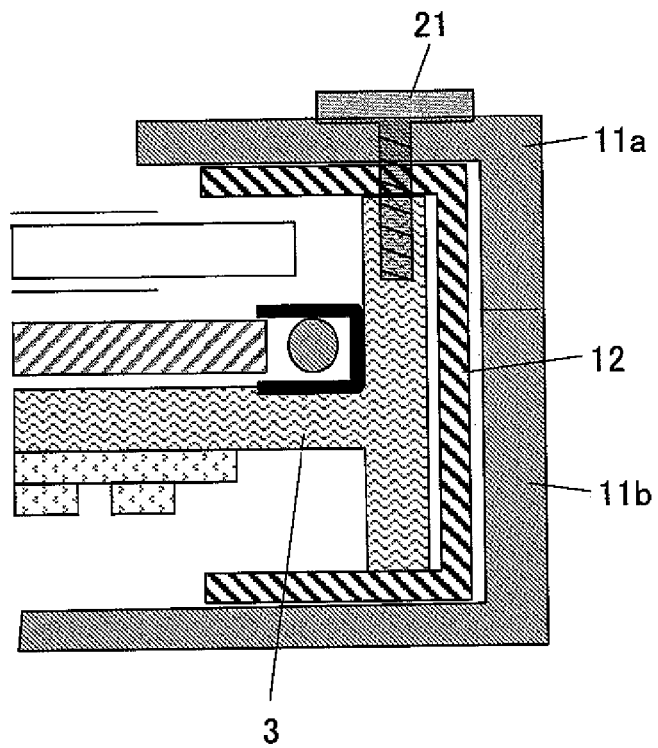
FIG. 10A is a cross sectional view illustrating another arrangement in the case where the metal plate, the bezel, and the housing of the liquid crystal display device are assembled together by use of the fixing screw.
Figure 10B:
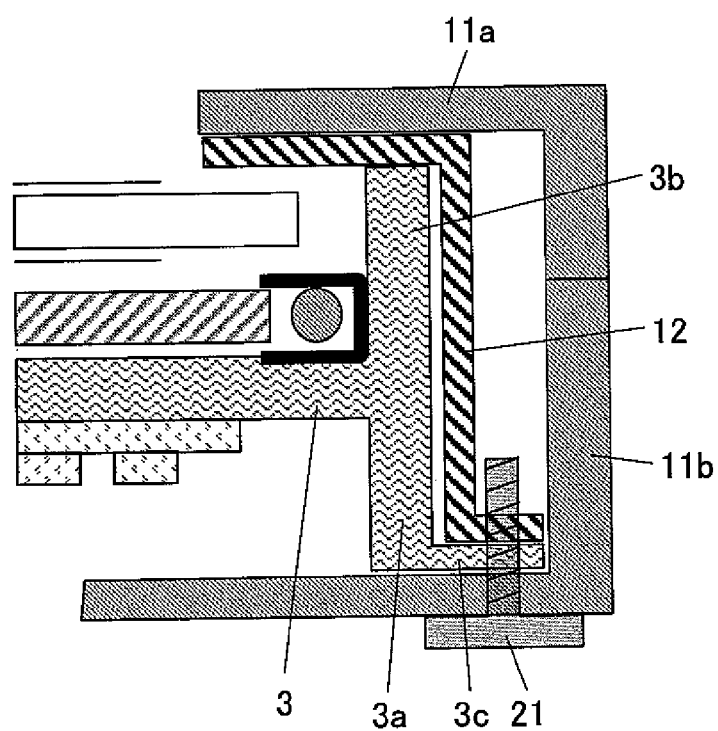
FIG. 10B is a cross sectional view illustrating still another arrangement in the case where the metal plate, the bezel, and the housing of the liquid crystal display device are assembled together by use of the fixing screw.

A shape of the bezel 12 may be modified so as to suit a shape of the metal plate 3 in a case where the strength of the metal plate 3 is further reinforced by providing a bent section 3c which is bent along an inside of a bottom section of the back housing 11b from the lower end of the falling portion 3a, as illustrated in FIG. 10B, for example. That is to say, in a case where the bent section 3c is arranged so as to extend toward the outer wall of the back housing 11b from the lower end of the falling portion 3a, the bezel 12 may have a bent section of a same shape as the bent section 3c, and may be shaped so as to circumscribe an outer wall surface of the falling portion 3a and rising portion 3b, an upper surface of the bent section 3c, and the upper end of the rising portion 3b.

As such, it is preferable for the liquid crystal display device according to a preferred embodiment of the present invention to have at least one of the upper end of the rising portion 3b and the lower end of the falling portion 3a to be in contact with the bezel 12 and at least one of the front housing 11a and the back housing 11b. This allows the metal plate 3 to function as a fixed beam. Hence, the deflection of the liquid crystal display device is reduced.

As a modification of the bezel 12 and the metal plate 3 that are illustrated in FIG. 9A, the metal plate 3 may be modified so as to have just the falling portion 3a and not the rising portion 3b. This modification is possible by replacing the rising portion 3b with a part of the bezel 12, and thickening a thickness of an upper part of the bezel 12.

Similarly, the metal plate 3 can be modified so as to have just the rising portion 3b and not the falling portion 3a, by replacing the falling portion 3a with a part of the bezel 12, and thickening a thickness of a lower part of the bezel 12.

As such, the bezel 12 lies between the housing 11 and at least one of the falling portion 3a and the rising portion 3b, in other words sandwiched between an inside surface of the housing 11 and at least one of the upper end of the falling portion 3a and the lower end of the rising portion 3b, so as to serve as a frame member which integrally supports the metal plate 3 and at least the liquid crystal display panel 1 and the backlight system 2.

Rigidity of the falling portion 3a or the rising portion 3b of the metal plate 3 is improved by providing the bezel 12. Thus, strength as the fixed beam is reinforced. As a result, strength against load or impact on the liquid crystal display apparatus 10 is further reinforced. Moreover, the impact on the front surface or the back surface of the liquid crystal display device 10 is dispersed to the rigid plate 3 from the housing 11 via the bezel 12. This reduces breakage of the liquid crystal display device 10.

Further, the bezel 12 allows integral supporting of the metal plate 3 and at least the liquid crystal display panel 1 and the backlight system 2. Hence, it is possible to handle these components as an integrated unit, which is a liquid crystal module.

Note that a layer made of impact absorbing material (e.g., gel material) may be provided between the housing 11 and the bezel 12 for relaxing impact on the liquid crystal display device 10.

Further, by fixing the metal plate 3 and the housing 11 and/or the bezel 12, rigidity of the liquid crystal display device 10 and resistance to pressure and drop due to gravity of the liquid crystal display device 10 are improved.

There are various methods in how to fix the metal plate 3 and the housing 11 and/or the bezel 12. For example, a first fixing method is to screw a fixing screw 21 perpendicularly to an outer side surface of the housing 11, as illustrated in FIGS. 9A and 9B. This screw integrally fixes the housing 11, the bezel 12 and the metal plate 3. The method is not necessarily limited to the outer side surface of the housing 11. For example, the fixing screw 21 may be screwed to an upper surface of the front housing 11a perpendicularly so as to integrally fix the housing 11, the bezel 12 and the metal plate 3, as illustrated in FIG. 10A. Alternatively, the fixing screw 21 may be screwed to a lower surface of the back housing 11b perpendicularly so as to integrally fix the housing 11, the bezel 12 and the metal plate 3 via the bent section 3c and the bent section of the bezel 12, as illustrated in FIG. 10B.

Figure 11B:
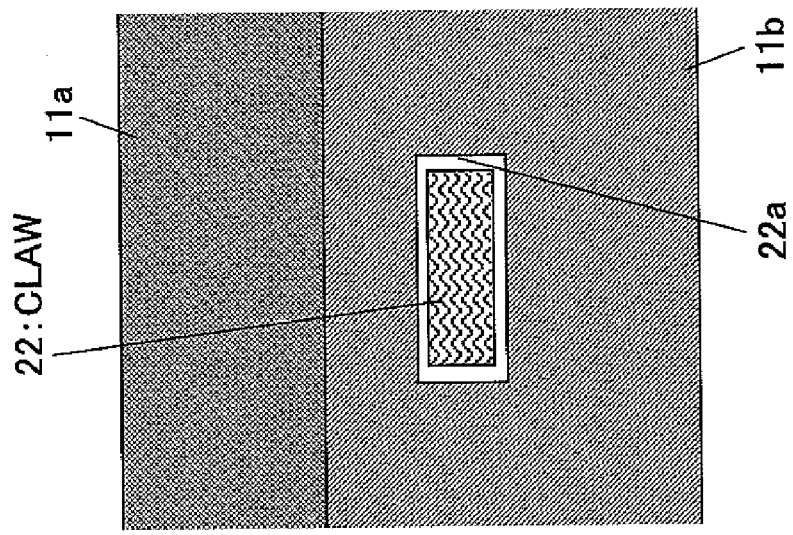
FIG. 11B is a side view illustrating the arrangement in the case where the metal plate, the bezel, and the housing of the liquid crystal display device are assembled together by use of the claw.
Figure 11A:
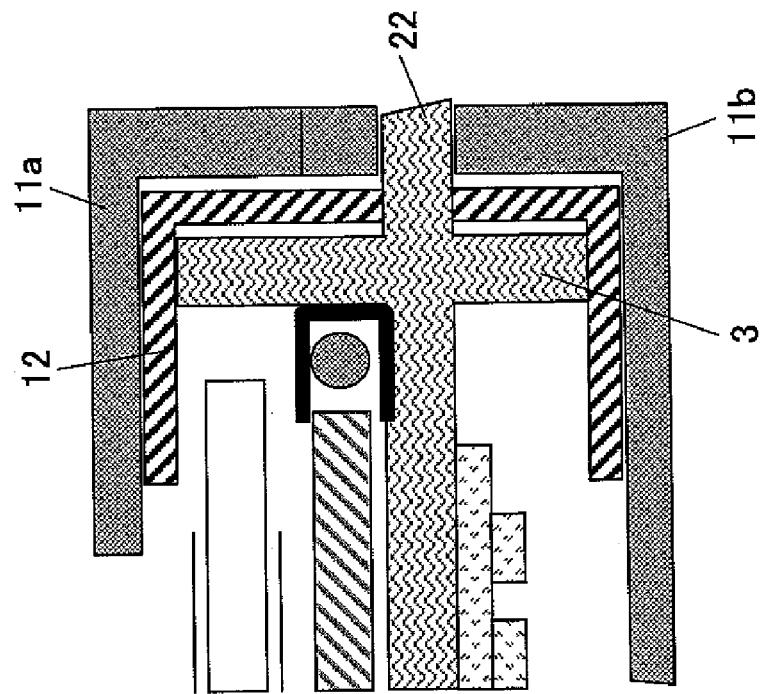
In FIG. 11A is a cross sectional view illustrating an arrangement in a case where the metal plate, the bezel, and the housing of the liquid crystal display device are assembled together by use of a claw.
Figure 14A:
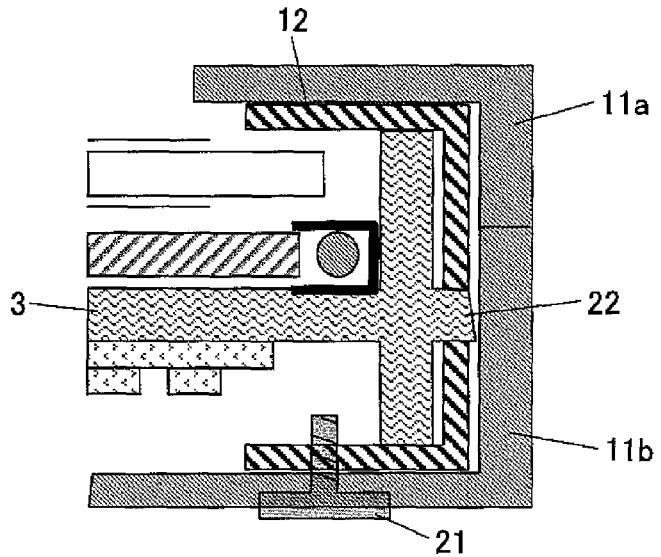
FIG. 14A is a cross sectional view illustrating an arrangement in a case where the metal plate, the bezel, and the housing of the liquid crystal display device are assembled together by use of a claw and an adhesive in combination.
Figure 14B:
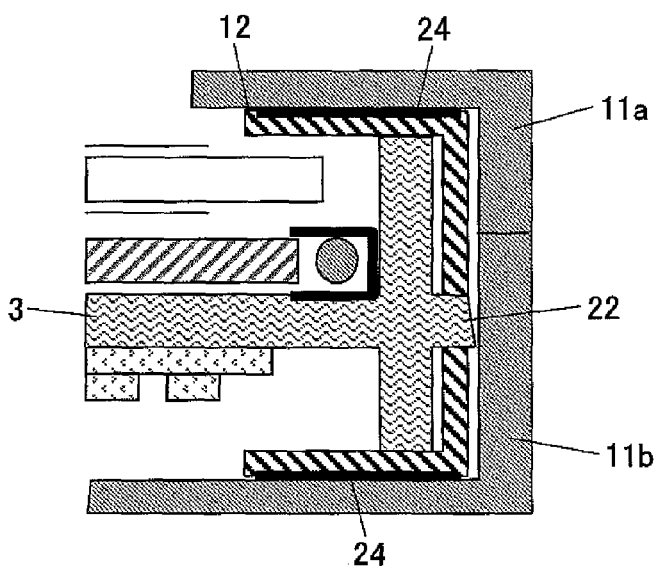
FIG. 14B is a cross sectional view illustrating another arrangement in the case where the metal plate, the bezel, and the housing of the liquid crystal display device are assembled together by use of the claw and the adhesive in combination.

A claw 22 (projection) may be used as a second fixing method, as illustrated in FIGS. 11A and 11B. An arrangement as follows may be adopted as the claw 22, for example: a claw 22 of a projection form is provided on a side of a horizontal section of the metal plate 3; the claw 22 is inserted through the bezel 12, and is fixed (joined) into a hole 22a of the housing 11. The claw 22 may also be arranged so as to be fitted (joined) into a hole of the bezel 12, and not inserted through the housing 11, as illustrated in FIGS. 14A and 14B.

The fixing method by use of the claw 22 allows for simplification of a step of assembling the metal plate 3 and the bezel 12 than that of the fixing method by use of the fixing screw 21.

Figure 12:
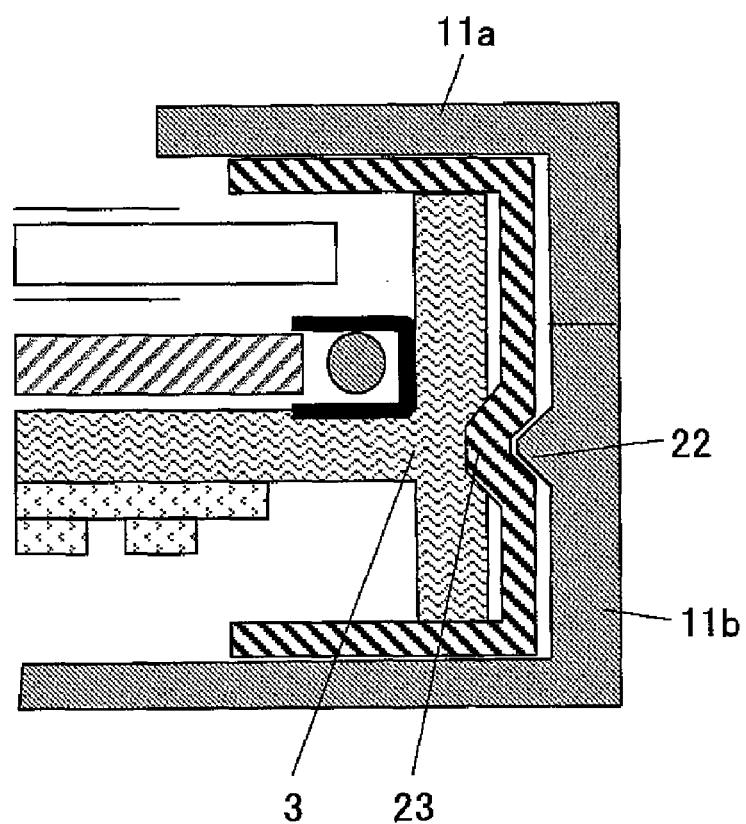
FIG. 12 is a cross sectional view illustrating another arrangement in the case where the metal plate, the bezel, and the housing of the liquid crystal display device are assembled together by use of the claw.

Moreover, the fixing method is not necessarily limited to this, and for example the claw 22 may be provided on one of the front housing 11a and back housing 11b, which claw 22 projects toward inside of the front housing 11a or the back housing 11b, and is to be inserted into a depression of the bezel 12, as illustrated in FIG. 12. Further, the bezel 12 may have a claw 23 formed thereon, which claw 23 is to be inserted into a depression of the metal plate 3. Note that it is preferable to concentrically provide the claw 22 (second protrusion), the depression of the bezel 12 (second depression), the claw 23 of the bezel 12 (first protrusion), and the depression of the metal plate 3 (first depression). In this case, the depression of the bezel 12 and the claw 23 of the bezel 12 may be unified, as illustrated in FIG. 12. This simplifies an arrangement for integrating the rigid plate 3, the bezel 12 and the housing 11 to the utmost.

Figure 13B:
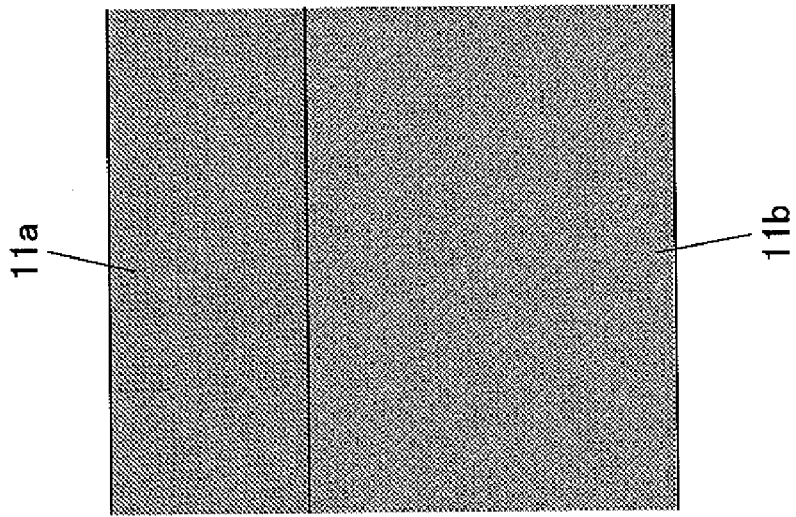
FIG. 13B is a side view illustrating the arrangement in the case where the metal plate, the bezel, and the housing of the liquid crystal display device are assembled together by use of the adhesive.
Figure 13A:
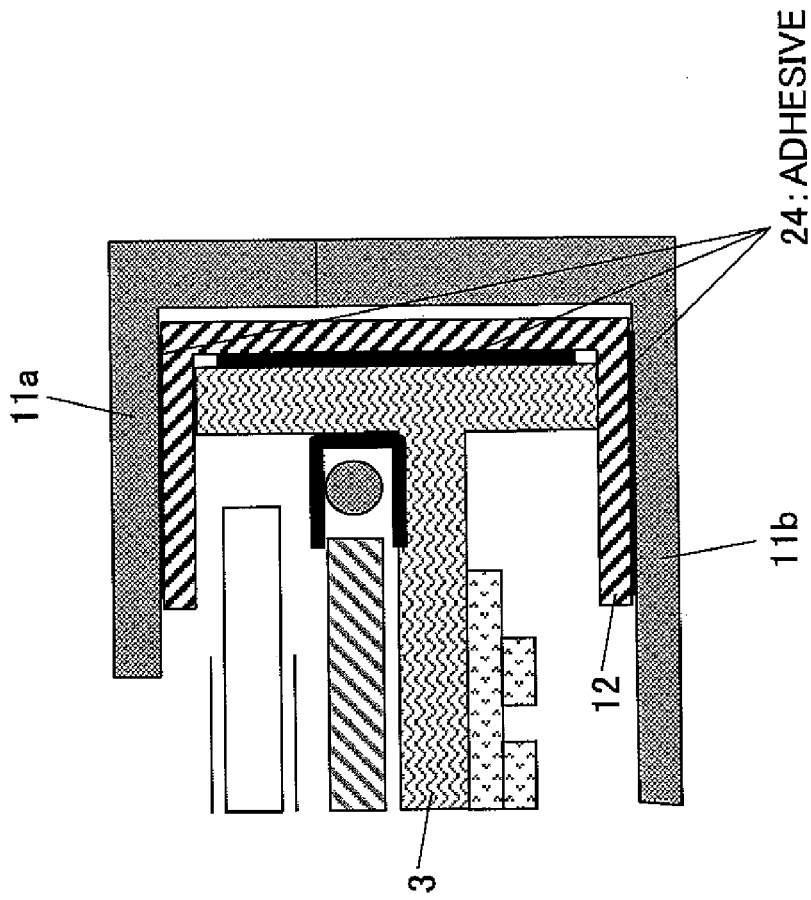
In FIG. 13A is cross sectional view illustrating an arrangement in a case where the metal plate, the bezel, and the housing of the liquid crystal display device are assembled together by use of an adhesive.

As a third fixing method, an adhesive 24 may be used, as illustrated in FIGS. 13A and 13B. In FIGS. 13A and 13B, for example, the adhesive 24 is applied between the metal plate 3 and the bezel 12, between the bezel 12 and the front housing 11a, and between the bezel 12 and the back housing 11b, such that the metal plate 3, the bezel 12, and the front housing 11a are adhered to and fixed by use of the adhesive 24.

Figure 14C:
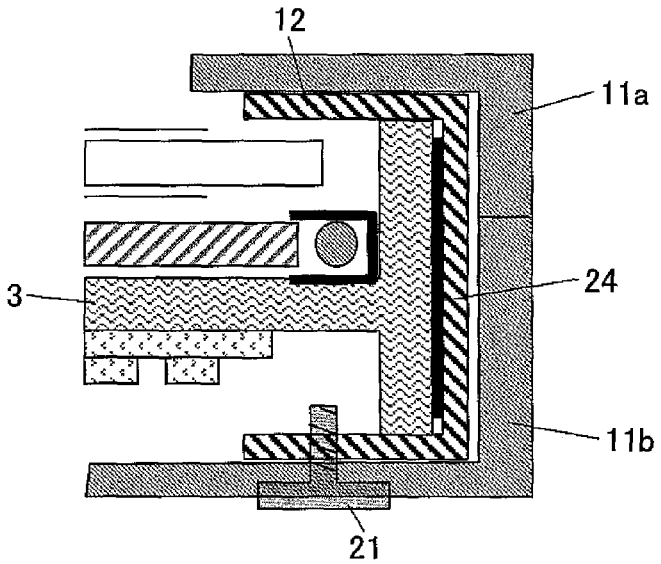
FIG. 14C is a cross sectional view of still another arrangement in the case where the metal plate, the bezel, and the housing of the liquid crystal display device are assembled together by use of the claw and the adhesive in combination.

Moreover, fixing may be carried out, for example, by use of the fixing screw 21, the claw 22, and the adhesive 24 in combination, as illustrated in FIGS. 14A, 14B, and 14C. How to provide the claw 22 may be carried out as illustrated in FIGS. 11A and 11B. This thus allows firm fixing of the metal plate 3, the bezel 12 and the housing 11.

Figure 18A:
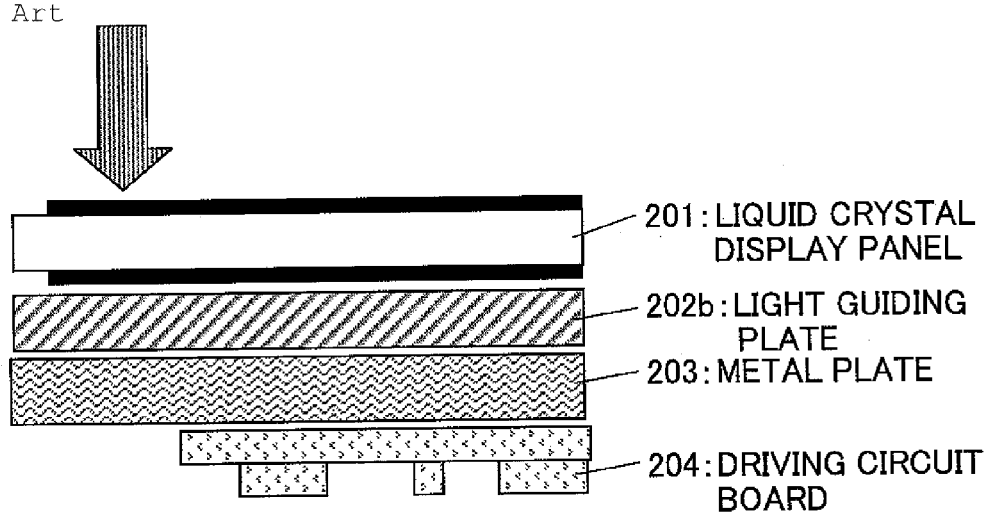
FIG. 18A is a cross sectional view illustrating another arrangement of a liquid crystal display device when a load is placed on the liquid crystal display device from the upper side of the liquid crystal display panel.
Figure 18B:
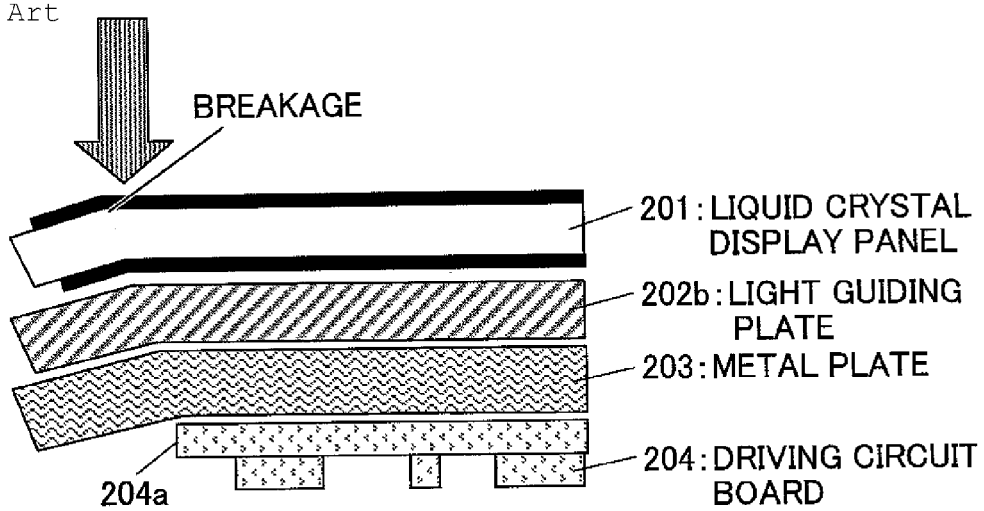
FIG. 18B is a cross sectional view illustrating the liquid crystal display device which has broken down due to the load.
Figure 19:
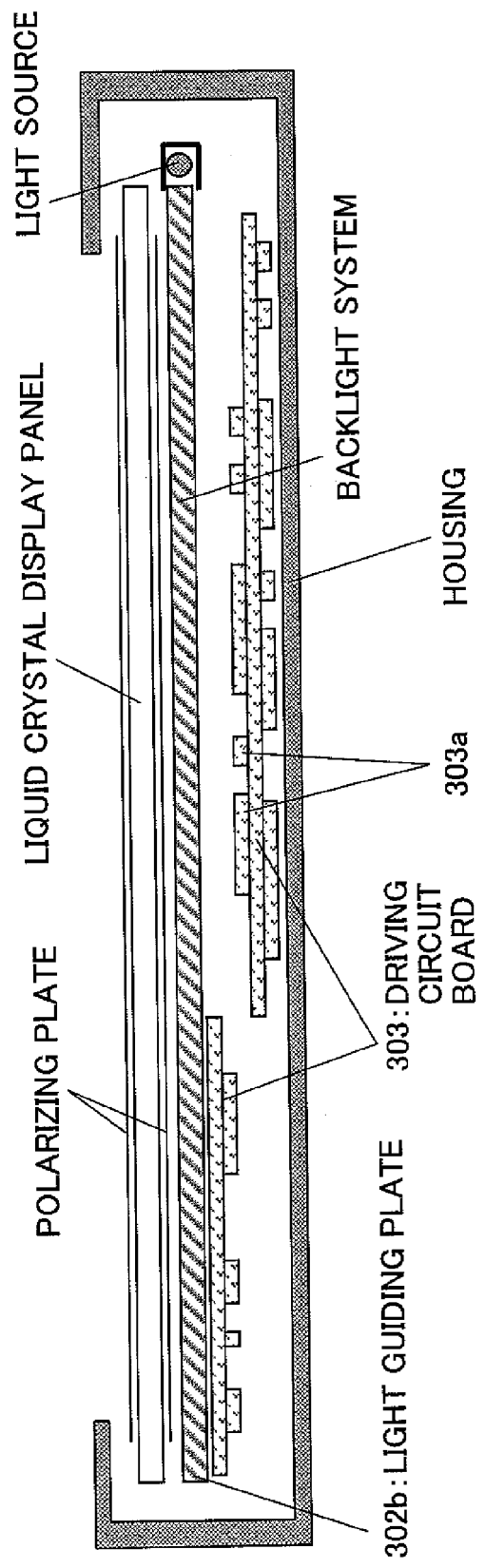
FIG. 19 is a cross sectional view illustrating an arrangement of still another conventional liquid crystal display device.

Japanese Unexamined Patent Publication No. 142404/2001 (Tokukai 2001-142404) also suggests an arrangement which provides a metal plate 203 which has no rising portion on edges on its back side, as illustrated in FIG. 18A. However, as illustrated in FIG. 18B, the metal plate 203 warps at an edge of the metal plate 203, that is, a section on which the rising portion is not formed, due to a load applied from an upper side. Further, in response to the warp in the metal plate 203, a liquid crystal display panel 201 and a light guiding plate 202b also warps. As a result, the liquid crystal display panel 201 breaks. Japanese Unexamined Patent Publication No. 142404/2001 (Tokukai 2001-142404) also describes that rigidity is improved by having a depression not illustrated of the metal board 203. However, having the depression causes a back side of the light guiding plate 202b to have a step form. This goes against an ideal arrangement of eliminating a step on the back side of the light guiding plate 202b. Further, in a case where a load is applied from a display surface side of the liquid crystal display panel 201, the liquid crystal display panel 201 warps. This causes the arrangement to be rather breakable.

The following description explains in detail of a difference in strength between a shape of the metal plate 203 described in Japanese Unexamined Patent Publication No. 142404/2001 (Tokukai 2001-142404) and a shape of the metal plate 3 of the present preferred embodiment.

First is a description of a difference in strength between the supporting form of the metal plate 203 and that of the metal plate 3. An amount of deflection ($\delta$max) in a case where there is no supporting member on the edges of a plate is represented as:

Amount of deflection ($\delta$max)=$PL^3/3EI$;

in a case where both edges of a plate are supported by free ends, the amount of deflection ($\delta$max) is represented as:

Amount of deflection ($\delta$max)=$PL^3/48EI$;

and further, in a case where both edges of a plate are supported by fixed ends, the amount of deflection ($\delta$max) is represented as:

Amount of deflection ($\delta$max)=$PL^3/192EI$, where L denotes a length of the plate, E denotes a modulus of elasticity, I denotes a second moment of area, and P denotes a concentrated load.

Namely, the amount of deflection significantly differs depending on whether the edges (i) are not supported, (ii) are supported by free ends, or (iii) are supported by fixed ends, even if the amount of deflection is of a same plate.

Hence, it is possible to reduce the amount of deflection to $\frac{1}{16}$ by providing a supporting member, and further reduce the amount of deflection to $\frac{1}{4}$ by changing how to support the edges, from free ends to fixed ends.

Here, the arrangement of the present preferred embodiment provides the falling portion 3a and the rising portion 3b around the metal plate 3. Conversely, the arrangement can be considered as a state in which the plate part of the metal plate 3 is fixed to the falling portion 3a and the rising portion 3b, that is, a case where both the edges of the metal plate 3 are supported by fixed ends.

On the other hand, the arrangement of Japanese Unexamined Patent Publication No. 142404/2001 (Tokukai 2001-142404) is considered as a case where the metal plate 203 has no supporting members, or is supported by the free ends. As a result, the arrangement of the present preferred embodiment has a smaller amount of deflection ($\delta$max) as compared to the arrangement of Japanese Unexamined Patent Publication No. 142404/2001 (Tokukai 2001-142404).

A deflection of the falling portion 3a and rising portion 3b may occur in the arrangement of the present preferred embodiment. Therefore, the effect is actually unattainable such that the amount of deflection is reduced to $\frac{1}{4}$. However, it is understandable that the arrangement is more difficult to warp as compared to the arrangement of Japanese Unexamined Patent Publication No. 142404/2001 (Tokukai 2001-142404) in which the metal plate 203 behaves as the free ends.

The above description explains an effect in a case where attention is given to a supporting form of the flat part of the metal plate 3. The following description explains an effect in regards to a flexural rigidity of a whole of the metal plate 3 that has the falling portion 3a and the rising portion 3b.

A strong flexural rigidity suppresses an amount of warp generated by an impact when dropped, in a case of a drop due to gravity. Therefore, breakage of the liquid crystal display panel 1 unreadily occurs. The arrangement which has the falling portion 3a and rising portion 3b along the outer periphery (P35L10) of the present embodiment is capable of accomplishing the improvement in rigidity while keeping the liquid crystal module thin and lightweight.

First, a second moment of area of (i) a plate-shaped metal plate and (ii) a metal plate on which the falling portion 3a and rising portion 3b are provided along the periphery of the metal plate are calculated as shown in FIG. 15.

In FIG. 15, in a case where, for example, a plate thickness t1 is 1 mm, a plate length b1 is 100 mm, a total height t2 of the falling portion 3a and rising portion 3b is 5 mm, a plate thickness b2 of the falling portion 3a and rising portion 3b is 1 mm, the second moment of area I of the conventional metal plate 203 is 8.3 mm$^4$, and the second moment of area I of the metal plate 3 of the present embodiment which provides the falling portion 3a and rising portion 3b is 29.2 mm$^4$. Consequently, the second moment of area I of the present preferred embodiment is about 3.5 times more of the conventional metal plate 203. When considering this result as the amount of deflection ($\delta$max), the amount of deflection may be made to approximately $\frac{2}{7}$, since the amount of deflection is in inverse proportion to the second moment of area I, as acknowledgeable from the formula of the amount of deflection.

In the above description, a shape of the periphery of the metal plate 3 is set as, for example, the total height t2 of the falling portion 3a and rising portion 3b as 5 mm, and the plate thickness b2 of the falling portion 3a and rising portion 3b as 1 mm. However, a higher total height t2 of the falling portion 3a and rising portion 3b and a thicker plate thickness b2 of the falling portion 3a and rising portion 3b demonstrate more effect in suppression of the deflection. For example, in a case where the total height t2 of the falling portion 3a and rising portion 3b is 10 mm, the amount of deflection may be reduced to about 1/20 of that of a metal plate 3 with only a flat plane. Therefore, it is possible to adopt an arrangement that is extremely strong against bending and twisting that occurs when dropped due to gravity.

That is to say, if the metal plate 203 or the metal plate 3 is provided on a back side of the backlight system, it is possible to reduce surface load and a warp (amount of deflection) generated caused by a drop due to gravity, according to the shape of the periphery of the metal plate 203 or 3. Therefore, according to the arrangement of the present preferred embodiment, an amount of warp generated is suppressed, and a strength of the liquid crystal display device 10 against external force such as a load, a drop due to gravity, and dropping of an object on the display surface, each of which may occur at a time of use, can be reinforced, while reducing thickness and weight of the liquid crystal display device 10.

Figure 20:
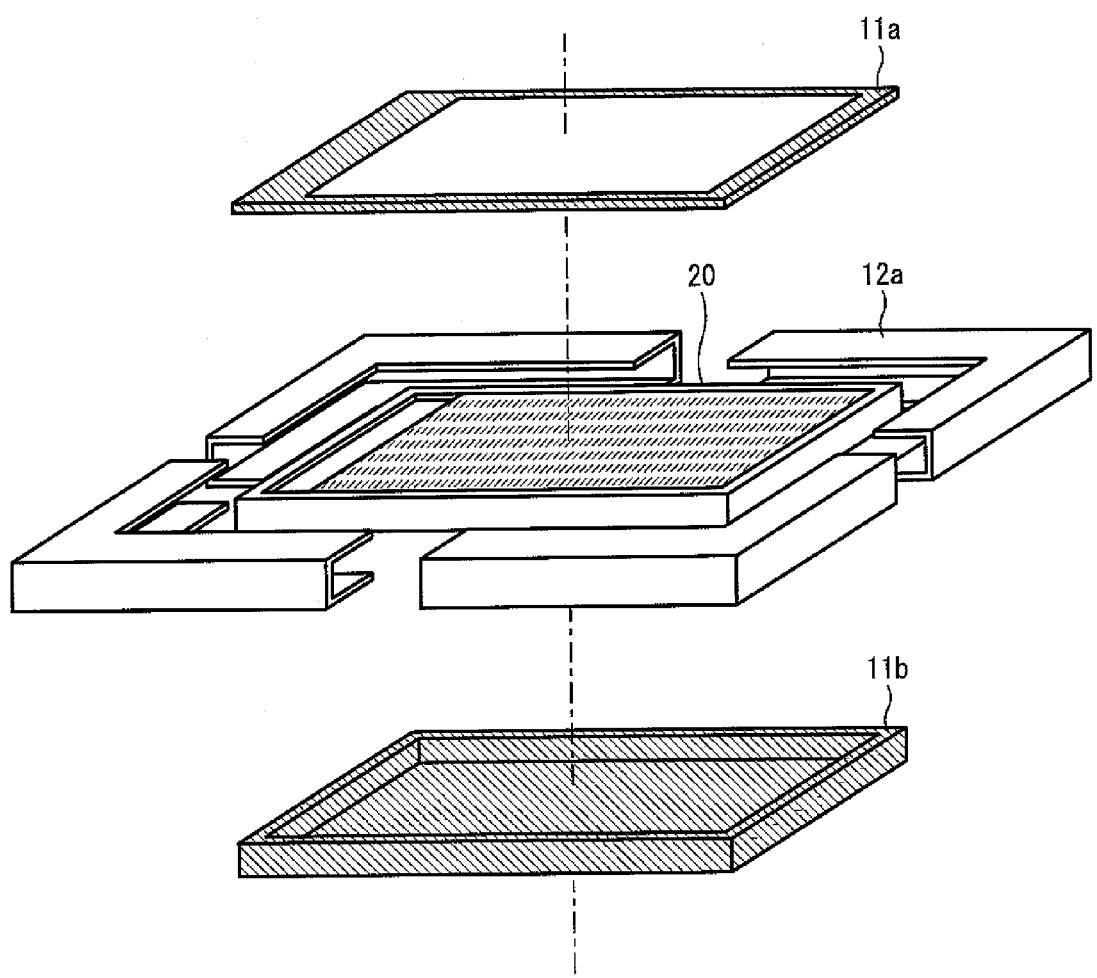
FIG. 20 is an exploded perspective view illustrating a liquid crystal display device in accordance with one preferred embodiment of the present invention.

The following description further explains an arrangement example of the bezel 12 with reference to FIGS. 20 though 23.

FIG. 20 illustrates a whole of the bezel 12 that is illustrated in FIG. 9A for example. The bezel 12 of FIG. 20 is preferably made of four units, for example, which an L-shaped bezel 12a serves as one unit. A longitudinal cross section of the L-shaped bezel 12a is of a U-shaped form, as illustrated in FIG. 9A. A liquid crystal module 20 which includes at least a stacked body of the liquid crystal display panel 1, the backlight system 2, and the rigid plate 3 is fitted into a U-shaped groove section of the L-shaped bezel 12a. That is to say, corners of the liquid crystal module 20 are fitted into the L-shaped bezels 12a, respectively.

As such, in a case where the bezel 12 is divided into a plurality of units, it is possible to improve a degree of freedom in designing of the bezel 12. This allows assembling the bezel 12 with variously embodied liquid crystal modules 20.

Note that the liquid crystal module 20 may include the driving circuit board 4.

Figure 21:
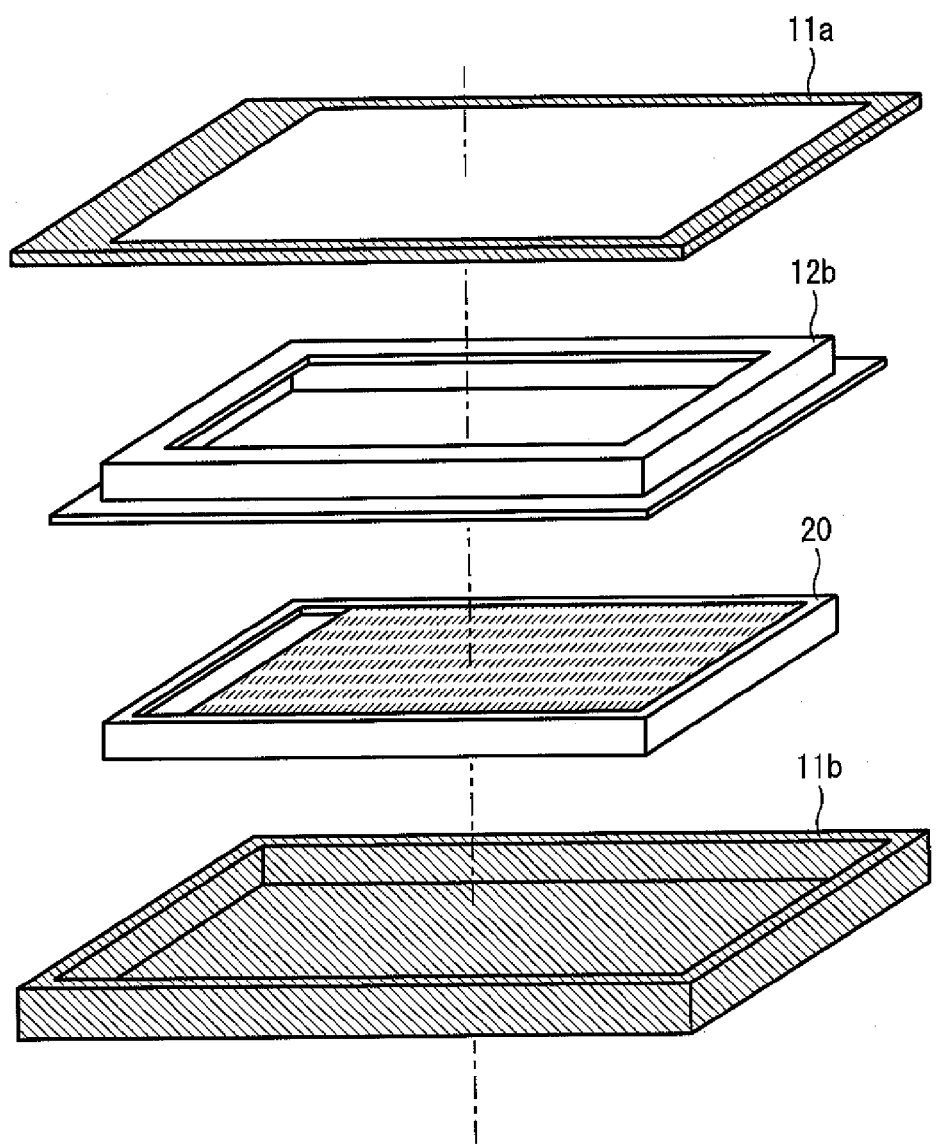
FIG. 21 is an exploded perspective view illustrating a liquid crystal display device in accordance with another preferred embodiment of the present invention.

FIG. 21 illustrates a whole of a bezel 12 as a bezel 12b which has bent sections on an upper portion and a lower portion of a longitudinal cross section of the bezel 12, which bent sections extend in opposite directions to each other, as like the bezel 12 illustrated in FIG. 10B, for example. The bezel 12b is arranged inseparable as different to the L-shaped bezel 12a, and the liquid crystal module 20 is housed inside the bezel 12b. Further, in the example of FIG. 21, the bezel 12b which houses the liquid crystal module 20 is housed in a box-shaped back housing 11b of which an upper surface is opened, and a front housing 11a is to be assembled as like a lid thereof.

Since the bezel 12b is inseparable, the assembling of the bezel 12b with the liquid crystal module 20 is simplified.

Figure 22:
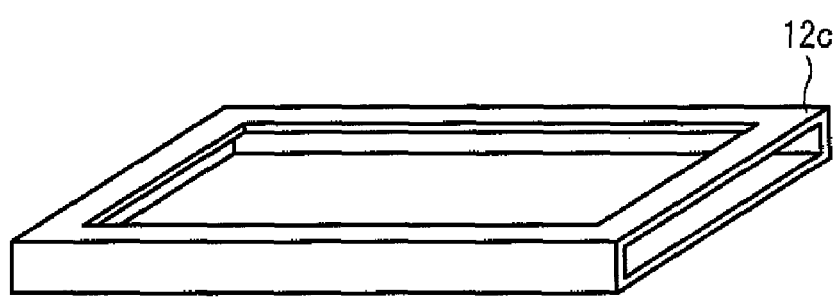
FIG. 22 is a perspective view illustrating a modification of a bezel that is applicable to the liquid crystal display device.

Further, the bezel 12 may be arranged so as to be a cartridge-type bezel 12c, as illustrated in FIG. 22. One of four sides of the cartridge-type bezel 12c is opened, and this opening enables sliding into and mounting of the liquid crystal module 20 inside the cartridge-type bezel 12c. In this case also, the assembling of the cartridge-type bezel 12c with the liquid crystal module 20 is simplified.

Next, schematic plan views of variations of the liquid crystal module 20 with which the bezel 12 is assembled are illustrated as patterns shown in FIGS. 23A-23G. The pattern shown in FIG. 23A corresponds to a case where the liquid crystal module 20 is assembled with the bezel 12b or the bezel 12c of an inseparable type. The pattern shown in FIG. 23C corresponds to a case where the liquid crystal module 20 is assembled with the L-shaped bezel 12a of a separable type. In the pattern shown in FIG. 23C, there are wide spaces between adjacent L-shaped bezels 12a, however the spaces may be narrower, or the adjacent L-shaped bezels 12a may be in contact with each other.

Figure 23A:
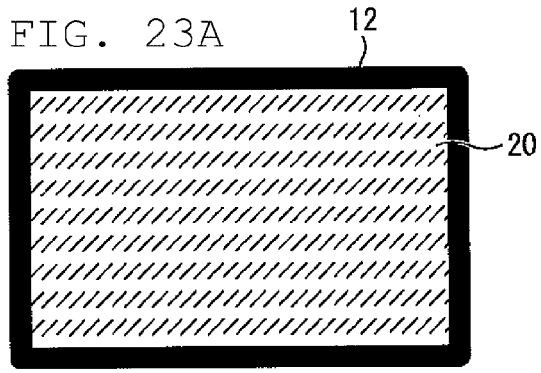
FIGS. 23A-23G are schematic plan views illustrating modification variations of the bezel.
Figure 23B:
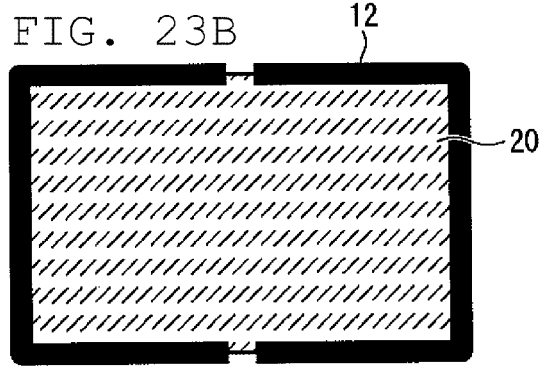
Figure 23C:
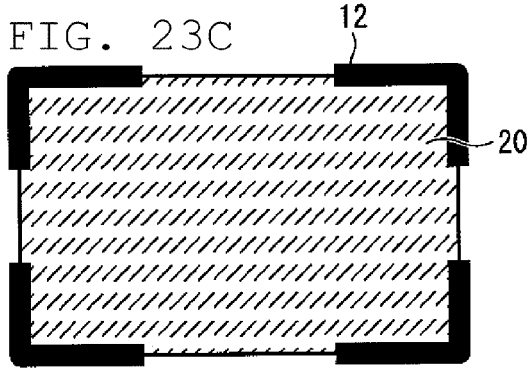
Figure 23D:
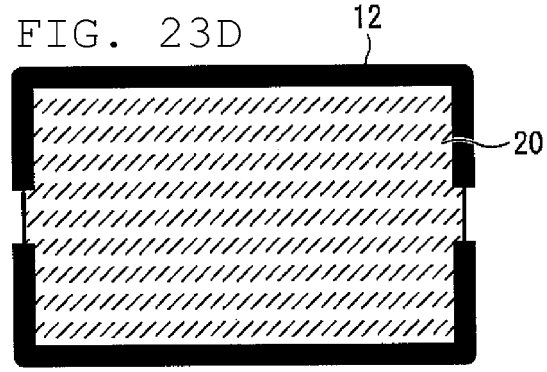
Figure 23E:
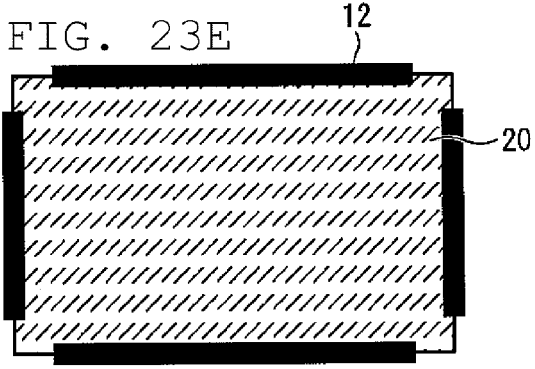
Figure 23F:
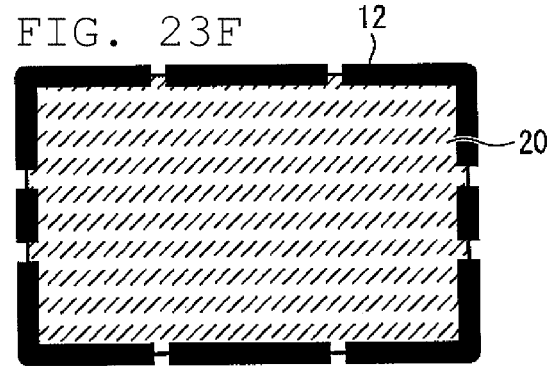
Figure 23G:
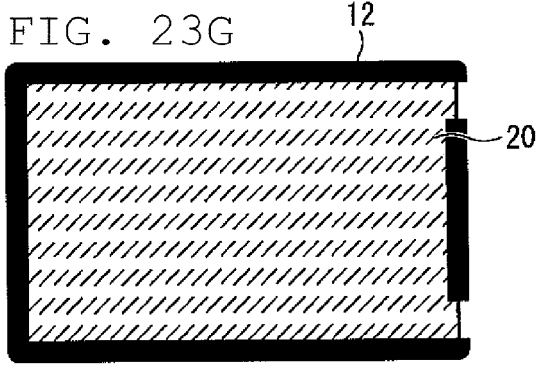

Other than the above, as illustrated in the patterns shown in FIGS. 23B, 23D, and 23G, how the bezel 12 is divided may be modified in various ways, even in a case where the bezel 12 is arranged in two units. Moreover, as illustrated in the pattern shown in FIG. 23E, even if the bezel 12 is arranged in four units, a shape of each of the units may be of a straight line form such that the units correspond to the four sides of the liquid crystal module, respectively. Further, as illustrated in the pattern shown in FIG. 23F, a plurality of L-shaped bezels and a plurality of straight-line-shaped bezels may be used in combination, such that the bezel 12 is arranged with even more units.

As such, in the liquid crystal display device 10 of the present preferred embodiment, the metal plate 3 is arranged such that a shape of a back side and a periphery of the liquid crystal display panel 1 is improved, instead of taking measures such as providing a protection board on a display surface side of the liquid crystal display panel 1, which such measures drop a display performance. Moreover, the strength and impact relaxing property of the liquid crystal display device 10 is improved by use of the bezel 12. This thus allows reduction of breakage of the liquid crystal display panel 1 due to pressure applied from a display surface of the liquid crystal display panel 1, a pushup applied from the driving circuit board 4 when dropped due to gravity, and further a warp of the liquid crystal module caused by a drop due to gravity. As a result, a bending stress which is applied on the liquid crystal display panel 1 is suppressed, and hence allows providing of the liquid crystal display panel 1 which is capable of attaining strength while reduced in thickness and weight.

As described above, the liquid crystal display device 10 of the present preferred embodiment includes a plate (hereinafter referred to as "rigid plate") made of rigid material, provided between the backlight system 2 and the driving circuit board 4, which rigid plate has a plane surface of a broader area than that of the backlight system 2. Therefore, the backlight system 2 is supported by a whole of a surface of the rigid plate. Consequently, even if a load is applied from an upper side of the liquid crystal display panel 1, the backlight system 2 does not bend at an edge of the rigid plate.

Moreover, the falling portion 3a is provided along at least a pair of opposed edges of the rigid plate, which falling portion 3a projects toward a driving circuit board side of the rigid plate. Consequently, the falling portion 3a provided along the edges allows the rigid plate to serve as a fixed beam, and causes a second moment of area to increase; thus, the deflection is reduced. This effect is attained as long as the falling portion 3a is formed along at least a pair of opposed edges of the rigid plate.

Further, the rigid plate has a back surface of a broader area than that of the driving circuit board 4; and the driving circuit board 4 is arranged so that a side facing the rigid plate is flat and even in level, and is provided so as to be in contact with the rigid plate.

Therefore, even if there is an impact such as a drop due to gravity, there is no protruding sections of for example circuit components or the like on a backlight system 2 side of the driving circuit board 4. Hence, it is not possible to cause breakage of the backlight or protruding section of the circuit component or the like due to a collision of the protruding section with the backlight system 2.

Moreover, the driving circuit board 4 is provided so as to be in contact with the rigid plate. Therefore, the driving circuit board 4 is integrated with the rigid plate. Hence, rigidity of the rigid plate is improved.

As a result, it is possible to provide a liquid crystal display device 10 which is capable of reducing breakage caused by a load placed on the display surface of the liquid crystal display panel 1 and an impact when dropped.

Moreover, the liquid crystal display device 10 of the present preferred embodiment joins and fixes the driving circuit board 4 and the rigid plate by the joining and fixing member. This allows a completely integrated state of the driving circuit board 4 and the rigid plate. Hence, the rigidity of the rigid plate is further reinforced.

In the liquid crystal display device 10 of the present preferred embodiment, the joining and fixing member preferably includes: a projecting section 3c provided on a back surface of the rigid plate; a through hole 4a of the driving circuit board 4 into which the projecting section 3c is to be inserted; and a first screw 6 which has a screw head 6a broader than the through hole 4a, which is screwed to a top section of the projecting section 3c inserted into the through hole 4a of the driving circuit board 4. In this way, the driving circuit board 4 can be fixed to the back surface of the rigid plate in a state in which the driving circuit board 4 is in contact with the back surface of the rigid plate.

In the present preferred embodiment, the projecting section 3c provided on the back surface of the rigid plate prevents breakage of the backlight system 2 caused by the first screw 6 reaching to the backlight system 2.

The joining and fixing member of the liquid crystal display device 10 of the present preferred embodiment may be arranged including: a projecting 3c provided on a back surface of the rigid plate; a through hole 4a of the driving circuit board 4 into which the projecting section 3c is to be inserted; and a second screw 7, which is screwed to a top section of the projecting section 3c inserted into the through hole 4a of the driving circuit board 4, via a washer 8 that is broader than the through hole 4a.

Use of the washer 8 which functions as the screw head 6a broader than the through hole 4a allows easy fixing of the driving circuit board 4, even if the first screw 6 having the screw head 6a broader than the through hole 4a is not used.

Moreover, (i) the rigid plate and (ii) the first screw 6 or the second screw 7 and the washer 8, of the liquid crystal display device 10 of the present embodiment are made of metal material. Accordingly, a ground terminal is provided around the through hole 4a of the driving circuit board 4 so as to be directly or indirectly in touch with and electrically connected to the first screw 6 or the second screw 7 while the first screw 6 or the second screw 7 is tightened up.

Consequently, grounding of the driving circuit board 4 can be provided via a ground (GND) pattern 4b, the first screw 6 or the second screw 7 and washer 8, and the metal plate 3. Of course, the arrangement may have a conductive spacer sandwiched between the ground pattern 4b, the first screw 6, the second screw 7, the washer 8, and the metal plate 3.

It is preferable for the liquid crystal display device 10 of the present preferred embodiment to have a rising portion 3b provided along at least a pair of opposed edges of the rigid plate, which rising portion 3b projects toward an opposite side of the driving circuit board 4. This allows a further increase in the second moment of area, by which deflection is reduced.

Moreover, in the liquid crystal display device 10 of the present preferred embodiment, the rigid plate is preferably formed in a rectangular shape. Note that a rectangle conceptually includes a square.

This makes it possible to provide a liquid crystal display device 10 capable of reducing breakage caused by a load placed on the display surface of the liquid crystal display panel 1 and an impact when dropped, in a case where the shape of the liquid crystal display device 10 is of a common rectangle.

Moreover, in the liquid crystal display device 10 of the present preferred embodiment, the rigid plate preferably has a rectangular or substantially rectangular shape, and both the falling portion 3a and rising portion 3b are provided along two pairs of opposed edges of the rigid plate. Therefore, the rigid plate serves as a fixed beam in transverse and longitudinal directions, and further the second moment of area is increased. Therefore, the deflection is further reduced.

Moreover, the rigid plate is the metal plate 3 in the liquid crystal display device 10 of the present preferred embodiment. Hence, a common metal plate 3 may be readily used as the rigid plate. The metal plate 3 allows easy processing of the falling portion 3a. Therefore, such metal plate 3 requires low cost. Further, the metal plate 3 is usable for grounding the liquid crystal display device 10.

The metal plate 3 in the liquid crystal display device 10 preferably is made of aluminum alloy or magnesium alloy. This thus allows reduction in weight and improvement in rigidity of the metal plate 3.

In the liquid crystal display device 10 of the present preferred embodiment, the rigid plate functions as a fixed beam by the rigid plate having at least one of an upper end of the rising portion 3b and a lower end of the falling portion 3a be in contact with the housing 11. Thus, it is possible to reduce the deflection. Moreover, such arrangement allows dispersion of impact on a front or back surface of the liquid crystal display device 10, from the housing 11 to the rigid plate having a high rigidity. Hence, breakage of the liquid crystal display device 10 is reduced.

The liquid crystal display device 10 of the present preferred embodiment includes a bezel 12 provided between the housing 11 and at least one of the falling portion 3a and the rising portion 3b, so as to integrally support the rigid plate and at least the liquid crystal display panel 1 and the backlight system 2. Consequently, the liquid crystal display panel 1, the backlight system 2, and the rigid plate can be handled as an integrated unit, which is a liquid crystal module. Moreover, the rigid plate functions as a fixed beam when at least one of the upper end of the rising portion 3b and the lower end of the falling portion 3a is in contact with at least one of the bezel 12 and the housing 11. This thus allows reduction of the deflection. This arrangement allows dispersion of an impact from the front or back surface of the liquid crystal display device 10, from the housing 11 to the rigid plate having high rigidity, via the bezel 12. Hence, it is possible to reduce a possibility of breakage of the liquid crystal display device 10.

In the liquid crystal display device 10 of the present preferred embodiment, the backlight system 2 includes a light guiding plate 2b. This allows reduction of thickness of the backlight system 2.

A tablet personal computer that serves as a portable electronic apparatus of the present preferred embodiment includes the foregoing liquid crystal display device 10.

Consequently, it is possible to provide a portable electronic apparatus including the liquid crystal display device 10, which liquid crystal display device 10 is capable of reducing breakage caused by a load placed on a display surface of the liquid crystal display panel 1, and an impact when the liquid crystal display device 10 is dropped.

The preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention, provided such variations do not exceed the scope of the patent claims set forth below.

The present invention is applicable to a liquid crystal display device including a liquid crystal display panel, a backlight, and a driving circuit board for driving the liquid crystal display panel and the backlight, and is applicable to a portable electronic apparatus including the liquid crystal display device. The portable electronic apparatus in which the liquid crystal display device is applicable is, for example, a tablet personal computer, a display of a notebook computer, an information mobile terminal (PDA: Personal Digital Assistant), and a mobile phone.

The present invention is not limited to the portable electronic apparatus (tablet personal computer, display of a notebook computer, an information mobile terminal and a mobile phone). For example, an effect of strength reinforcement so that the liquid crystal display device is strong against external load which may occur at a time of carrying and handling the liquid crystal display device is attained also with a large-sized liquid crystal display apparatus such as a liquid crystal TV, information display or the like.

Hence, the arrangement of the present invention is applicable to all slim liquid crystal display devices including a large-sized TV.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
   a liquid crystal display panel;
   a backlight;
   a driving circuit board arranged to drive the liquid crystal display panel and the backlight;
   a rigid plate made of rigid material, provided between the backlight and the driving circuit board, the rigid plate having a plane surface of a broader area than that of the backlight; and
   a housing arranged to house the liquid crystal display panel, the backlight, the driving circuit board, and the rigid plate;
   at least one of a falling portion and a rising portion being provided along at least a pair of opposed edges of the rigid plate, the falling portion projecting toward a driving circuit board side of the rigid plate, and the rising portion projecting toward an opposite side of the falling portion;
   said liquid crystal display device, further comprising:
   a frame member provided between the housing and at least one of the falling portion and the rising portion so as to integrally support the rigid plate and at least the liquid crystal display panel and the backlight.

2. The liquid crystal display device as set forth in claim 1, wherein at least one of an upper end of the rising portion and a lower end of the falling portion is in contact with at least one of the frame member and the housing.

3. The liquid crystal display device as set forth in claim 1, wherein the frame member is inseparable from the liquid crystal display device.

4. The liquid crystal display device as set forth in claim 1, wherein the frame member is divided into a plurality of units.

5. The liquid crystal display device as set forth in claim 1, wherein the frame member has a cartridge structure arranged to cause a liquid crystal module to slide and to be mounted inside the frame member, the liquid crystal module including the liquid crystal display panel, the backlight, and the rigid plate.

6. The liquid crystal display device as set forth in claim 1, wherein the rigid plate has a projection extending substantially parallel to a plane surface on which the backlight is mounted, the projection fitting into a hole of the frame member.

7. The liquid crystal display device as set forth in claim 6, wherein the projection further fits into a hole of the housing.

8. The liquid crystal display device as set forth in claim 1, wherein the frame member has a first protrusion, which protrudes towards inside of the frame member, and which fits into a first depression of a sidewall of the rigid plate, the sidewall including at least one of the falling portion and the rising portion, the frame member fixed to the rigid plate through a joint of the first protrusion and the first depression.

9. The liquid crystal display device as set forth in claim 8, wherein the housing has a second protrusion, which protrudes toward inside of the housing, and which fits into a second depression of a sidewall of the frame member, the housing fixed to the frame member through a joint of the first protrusion and the first depression.

10. The liquid crystal display device as set forth in claim 9, wherein the first depression, the first protrusion, the second depression, and the second protrusion, are concentrically arranged.

11. The liquid crystal display device as set forth in claim 1, wherein the driving circuit board is arranged so that a side facing the rigid plate is flat and even in level, and is provided so as to be in contact with the rigid plate.

12. The liquid crystal display device as set forth in claim 1, further comprising at least one joining and fixing member arranged to join and fix the driving circuit board to the rigid plate.

13. The liquid crystal display device as set forth in claim 12, wherein the at least one joining and fixing member includes:
   a projecting section provided on a back surface of the rigid plate;
   a through hole of the driving circuit board into which the projecting section is to be inserted; and
   a screw having a screw head broader than the through hole, which is screwed to a top section of the projecting section inserted into the through hole of the driving circuit board.

14. The liquid crystal display device as set forth in claim 13, wherein
   the rigid plate and the screw are made of metal material, and
   a ground terminal is provided around the through hole of the driving circuit board so as to be directly or indirectly in touch with and electrically connected to the screw while the screw is tightened up.

15. The liquid crystal display device as set forth in claim 12, wherein the at least one joining and fixing member includes:
   a projecting section provided on a back surface of the rigid plate;
   a through hole of the driving circuit board into which the projecting section is to be inserted; and
   a screw, which is screwed to a top section of the projecting section inserted into the through hole of the driving circuit board, via a washer that is broader than the through hole.

16. The liquid crystal display device as set forth in claim 1, wherein the rigid plate has a rectangular or substantially rectangular shape.

17. The liquid crystal display device as set forth in claim 1, wherein both of the falling portion and rising portion are arranged along said at least a pair of opposed edges of the rigid plate.

18. The liquid crystal display device as set forth in claim 1, wherein the rigid plate is made of metal material.

19. The liquid crystal display device as set forth in claim 18, wherein the metal material is aluminum alloy or magnesium alloy.

20. The liquid crystal display device as set forth in claim 1, wherein the backlight includes a light guiding plate.

21. A portable electronic apparatus comprising the liquid crystal display device as set forth in claim 1.

22. A stationary electronic apparatus comprising the liquid crystal display device as set forth in claim 1.

* * * * *